US008745534B2

(12) United States Patent
Kawana et al.

(10) Patent No.: US 8,745,534 B2
(45) Date of Patent: Jun. 3, 2014

(54) METHOD OF SCROLLING A HIERARCHY OF LAYERS BASED UPON THE NUMBER OF MANIPULATING BODIES

(75) Inventors: Yousuke Kawana, Tokyo (JP); Tetsuo Ikeda, Tokyo (JP); Hiroshi Ueno, Tokyo (JP); Ryu Aoyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 592 days.

(21) Appl. No.: 13/012,292

(22) Filed: Jan. 24, 2011

(65) Prior Publication Data

US 2011/0202880 A1 Aug. 18, 2011

(30) Foreign Application Priority Data

Feb. 17, 2010 (JP) .................................. 2010-032546

(51) Int. Cl.
*G06F 3/048* (2013.01)
(52) U.S. Cl.
USPC ............................ 715/830; 715/784; 715/786
(58) Field of Classification Search
None
See application file for complete search history.

(56) References Cited

U.S. PATENT DOCUMENTS

2008/0174567 A1* 7/2008 Woolley et al. ................ 345/173
2009/0007007 A1* 1/2009 Voros et al. .................... 715/786

FOREIGN PATENT DOCUMENTS

JP 8-76926 3/1996

* cited by examiner

*Primary Examiner* — Matt Kim
*Assistant Examiner* — William Trapanese
(74) *Attorney, Agent, or Firm* — Oblon, Spivak, McClelland, Maier & Neustadt, L.L.P.

(57) ABSTRACT

An information processing device includes a display panel for displaying display items belonging to a predetermined layer among display items divided into a plurality of layers, a manipulating body detection unit for detecting the number of manipulating bodies moving on a touch panel along with a movement direction and a movement amount of the manipulating body, and a display control unit for performing display control so that display items belonging to the predetermined layer are scroll-displayed on the basis of detection results of the movement direction and the movement amount if a movement of manipulating bodies whose number corresponds to the predetermined layer is detected, display items belonging to another layer are displayed if a movement of manipulating bodies whose number corresponds to the other layer is detected, and the display items belonging to the other layer are scroll-displayed on the basis of detection results.

14 Claims, 24 Drawing Sheets

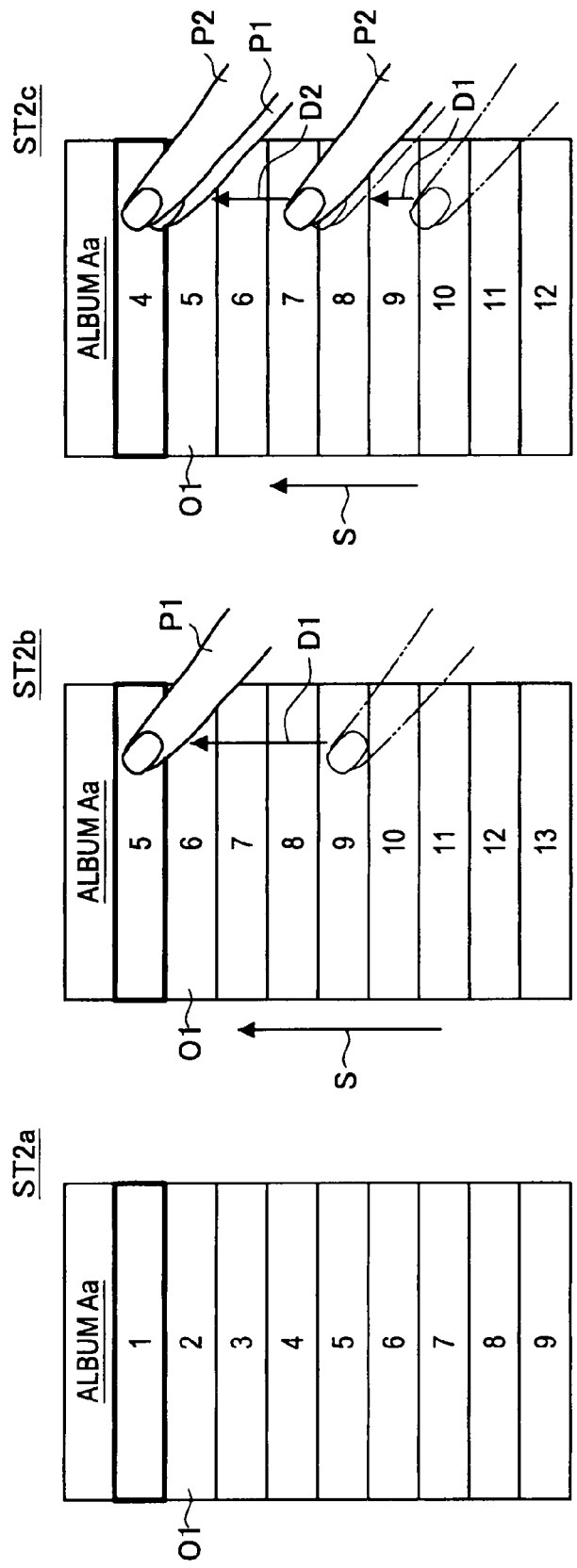

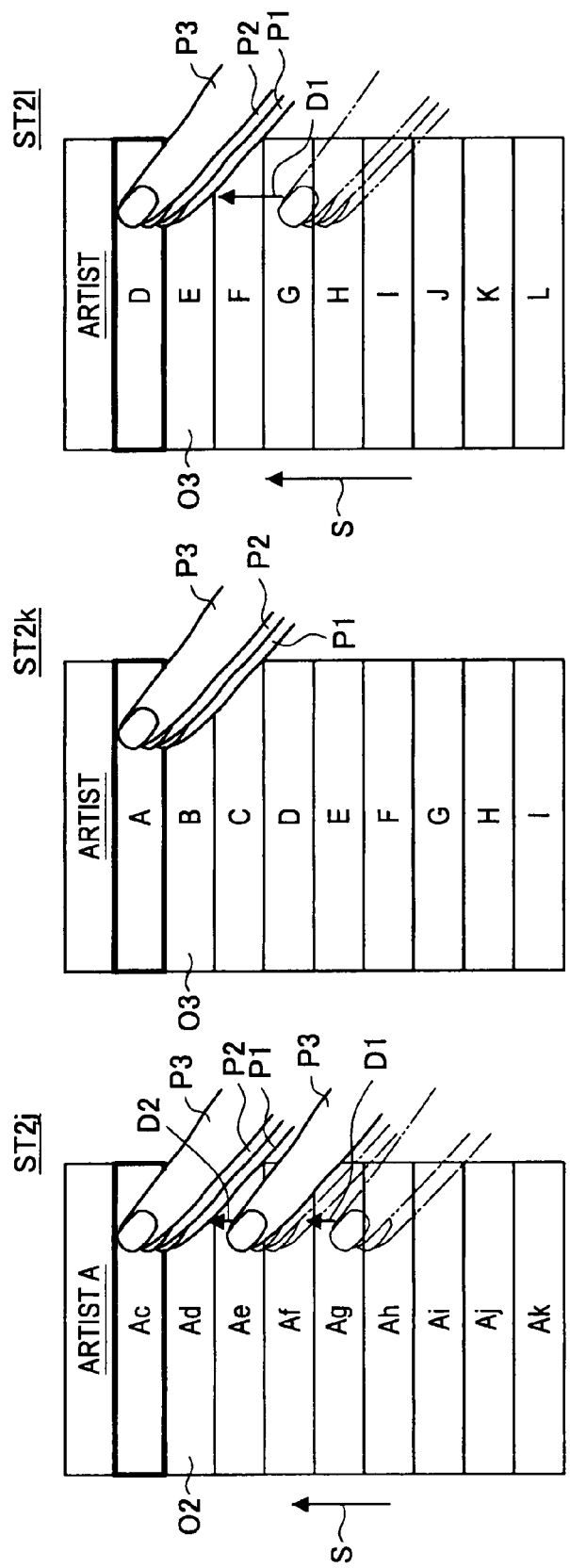

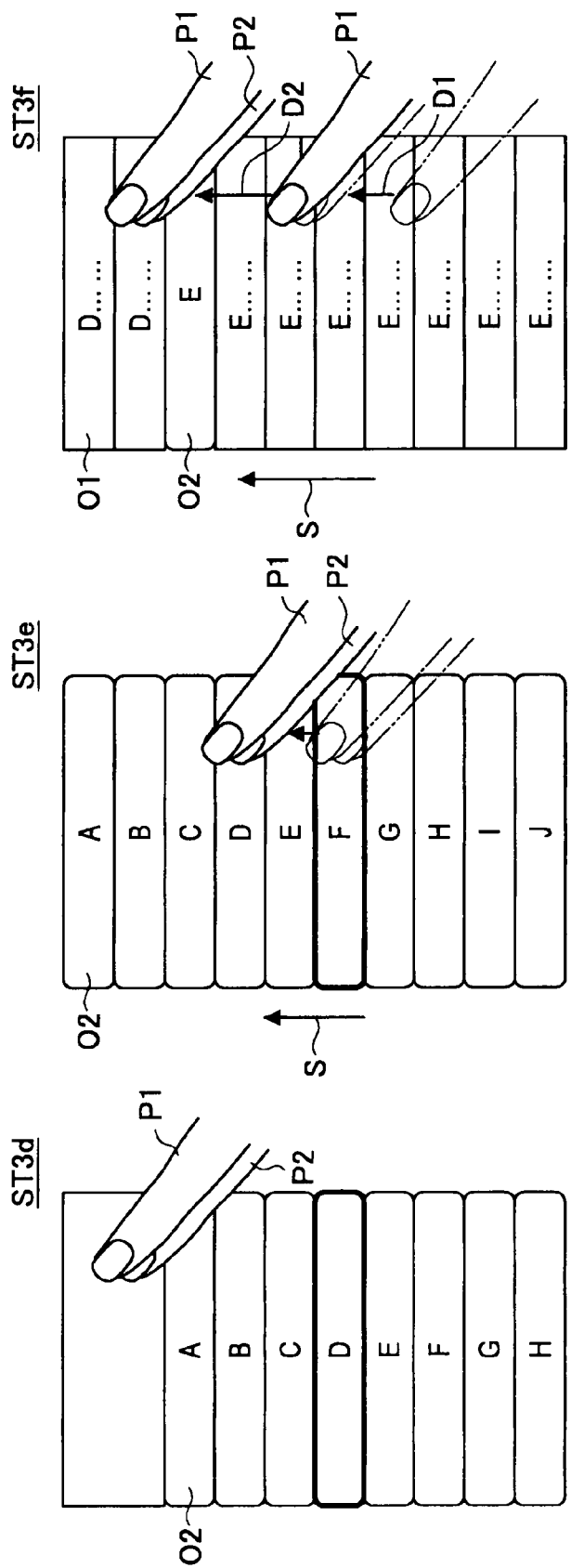

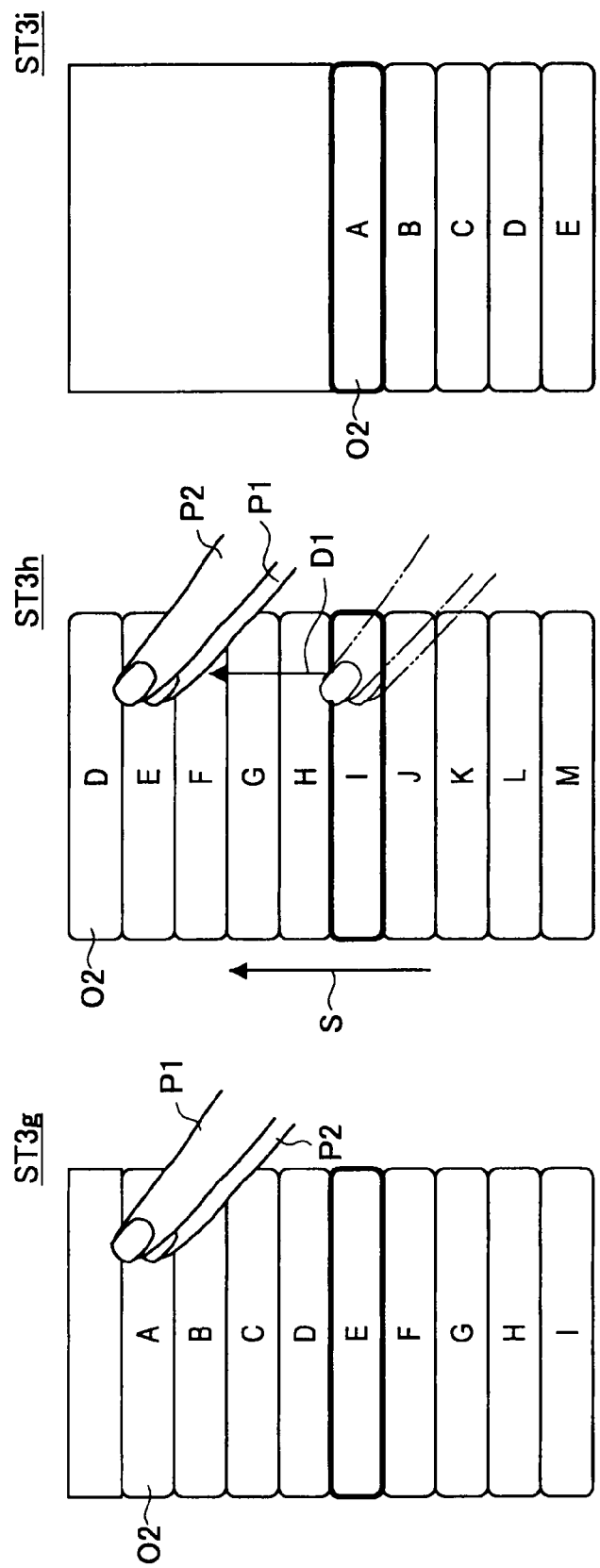

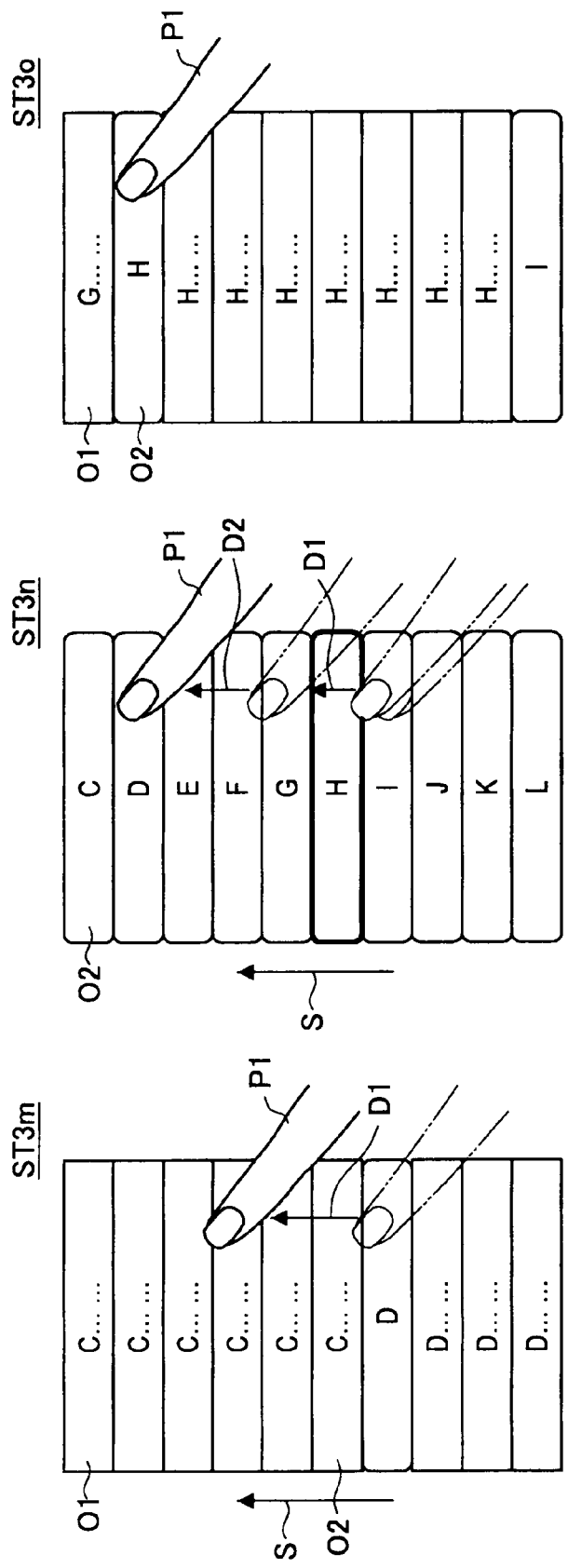

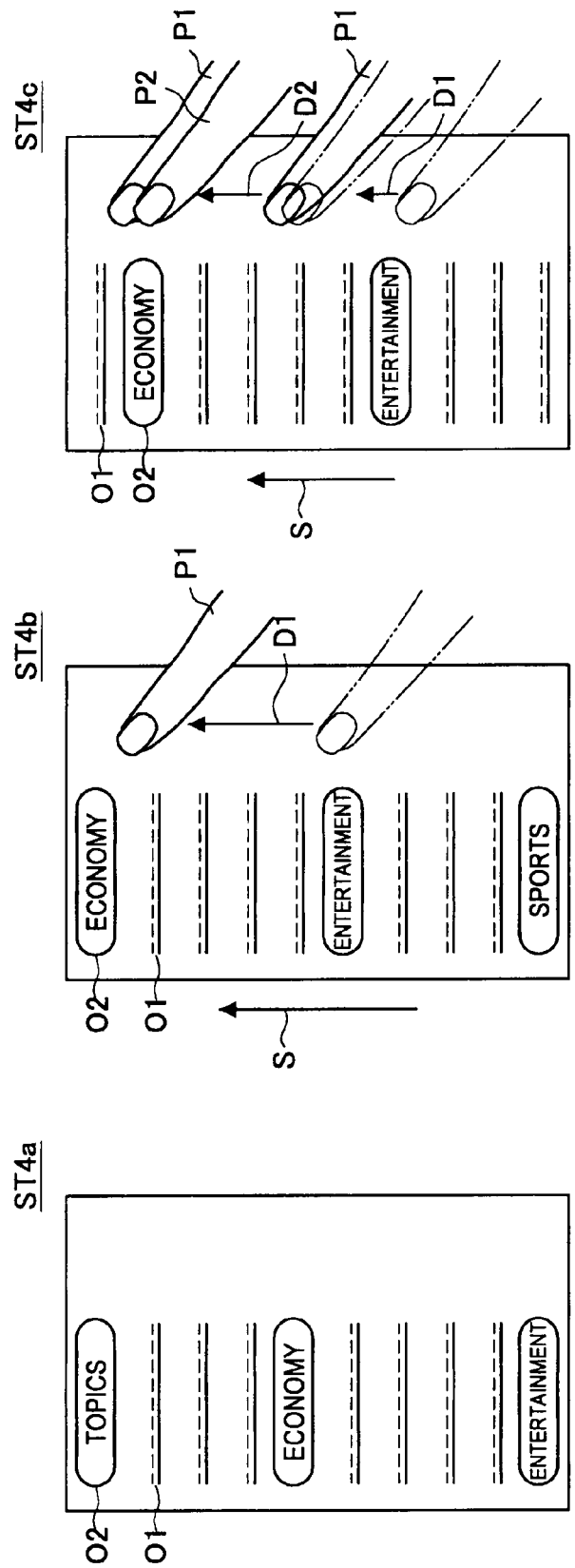

METHOD OF SCROLLING A HIERARCHY OF LAYERS BASED UPON THE NUMBER OF MANIPULATING BODIES

FIELD OF THE INVENTION

The present invention relates to an information processing device, an information processing method, and a program.

DESCRIPTION OF THE RELATED ART

Users of information processing devices tend to be forced to perform complex manipulation by a manipulating body (a user's finger, a stylus, or the like) on a touch panel or a touch pad so as to search for a desired display item by scroll-displaying display items on manipulation menus of various types of software. In particular, this tendency is remarkable if display items are divided into a plurality of layers.

For example, the case where a desired thumbnail is searched from thumbnails divided into a plurality of albums is assumed in photo browsing software. In this case, first, the user searches for and selects a desired album by scroll-displaying display items by drag manipulation on an upper-layer selection screen (album selection screen). Next, the user searches for a desired thumbnail by switching the selection screen to a lower-layer selection screen (thumbnail selection screen) and scroll-displaying display items by drag manipulation on the lower-layer selection screen.

Consequently, the user is forced to perform complex manipulation since switching manipulation of the selection screen having a hierarchical structure should be performed along with drag manipulation for scroll-displaying display items. The complexity of manipulation is remarkable when display items are divided into a number of layers.

Here, flick manipulation (manipulation of flicking a touch panel surface, a touch pad surface, or the like in a predetermined direction with a manipulating body) to scroll-display display items more widely than drag manipulation may be used to reduce the number of drag manipulations. In Japanese Patent Application Laid-open No. 8-76926, a technique of changing a paging unit of an electronic book in response to the number of manipulating bodies, which moves on a touch panel for scroll display, is proposed.

SUMMARY OF THE INVENTION

However, since a display item is widely scroll-displayed in the flick manipulation, a display screen may be intensively changed, the sight of a focused display item may be easily lost and a search for a desired display item may be rather difficult. In the proposal of the above-described Japanese Patent Application Laid-open No. 8-76926, the drag manipulation for each layer may be efficiently performed if display items are divided into a plurality of layers, but layer switching manipulation is inevitable.

In light of the foregoing, it is desirable to provide an information processing device, an information processing method, and a program capable of efficiently searching for a desired display item from display items divided into a plurality of layers.

According to an embodiment of the present invention, there is provided an information processing device including a display unit for displaying display items belonging to a predetermined layer among display items divided into a plurality of layers, a detection unit for detecting the number of manipulating bodies moving on a sensing region along with a movement direction and a movement amount of the manipulating body, and a display control unit for performing display control so that display items belonging to the predetermined layer are scroll-displayed on the basis of detection results of the movement direction and the movement amount if a movement of manipulating bodies whose number corresponds to the predetermined layer is detected, display items belonging to another layer are displayed if a movement of manipulating bodies whose number corresponds to the other layer is detected, and the display items belonging to the other layer are scroll-displayed on the basis of detection results of the movement direction and the movement amount.

According to this configuration, the number of manipulating bodies moving on a sensing region is detected along with a movement direction and a movement amount of the manipulating body, and display items belonging to a layer corresponding to the number of manipulating bodies are scroll-displayed. Thereby, a user can efficiently search for a desired display item from display items divided into a plurality of layers by scroll-displaying display items belonging to different layers through a change of the number of manipulating bodies.

If the movement of the manipulating bodies whose number corresponds to the other layer is detected when the display items belonging to the predetermined layer are scroll-displayed, the display control unit may perform the display control so that the display items belonging to the other layer are scroll-displayed.

If layer transition of scroll display is made from the predetermined layer to the other layer, the display control unit may perform display control so that display items belonging to an upper or lower layer of a display item focused in the predetermined layer immediately before the layer transition is made are displayed among the display items belonging to the other layer.

If the movement of the manipulating bodies whose number corresponds to the other layer is not detected, the display control unit may perform display control so that display items belonging to a lower layer of a display item focused in the other layer immediately before the movement is not detected are displayed among the display items belonging to the predetermined layer.

If a movement of a manipulating body associated with a movement amount exceeding a predetermined threshold value is detected after a change of the number of manipulating bodies is detected, the display control unit may perform display control so that layer transition of scroll display is made.

If a movement of a manipulating body associated with a movement amount exceeding a predetermined threshold value is detected, the display control unit may perform display control so that display items are scroll-displayed.

The display control unit may perform display control so that display items are scroll-displayed by following a movement of the manipulating body.

The information processing device may include a notification unit for notifying an outside of layer transition of scroll display.

If one of the predetermined layer and the other layer corresponds to an upper layer and the other corresponds to a lower layer, the display control unit may scroll-display display items of the upper layer and the lower layer if a movement of manipulating bodies whose number corresponds to the lower layer is detected, and may scroll-display display items belonging to the upper layer if a movement of manipulating bodies whose number corresponds to the upper layer is detected.

According to an embodiment of the present invention, there is provided an information processing method including the steps of displaying display items belonging to a predetermined layer among display items divided into a plurality of layers, detecting the number of manipulating bodies moving on a sensing region along with a movement direction and a movement amount of the manipulating body, scroll-displaying display items belonging to the predetermined layer on the basis of detection results of the movement direction and the movement amount if a movement of manipulating bodies whose number corresponds to the predetermined layer is detected, displaying display items belonging to another layer instead of the display items belonging to the predetermined layer if a movement of manipulating bodies whose number corresponds to the other layer is detected, and scroll-displaying the display items belonging to the other layer on the basis of detection results of the movement direction and the movement amount.

According to another embodiment of the present invention, there is provided a program for causing a computer to execute the information processing method. Here, the program may be provided by using a computer-readable recording medium and may be provided via communication means.

According to the embodiments of the present invention as described above, it is possible to provide an information processing device, an information processing method, and a program capable of efficiently searching for a desired display item from display items divided into a plurality of layers.

BRIEF DESCRIPTION OF THE DRAWINGS

FIG. 4A is a diagram (1/7) showing an application example to music playing software;

FIG. 4D is a diagram (4/7) showing an application example to the music playing software;

FIG. 5B is a diagram (2/6) showing an application example to the list search software;

FIG. 5C is a diagram (3/6) showing an application example to the list search software;

FIG. 5E is a diagram (5/6) showing an application example to the list search software;

FIG. 6A is a diagram (1/3) showing an application example to web browsing software;

DETAILED DESCRIPTION OF THE EMBODIMENT(S)

Figure 1:
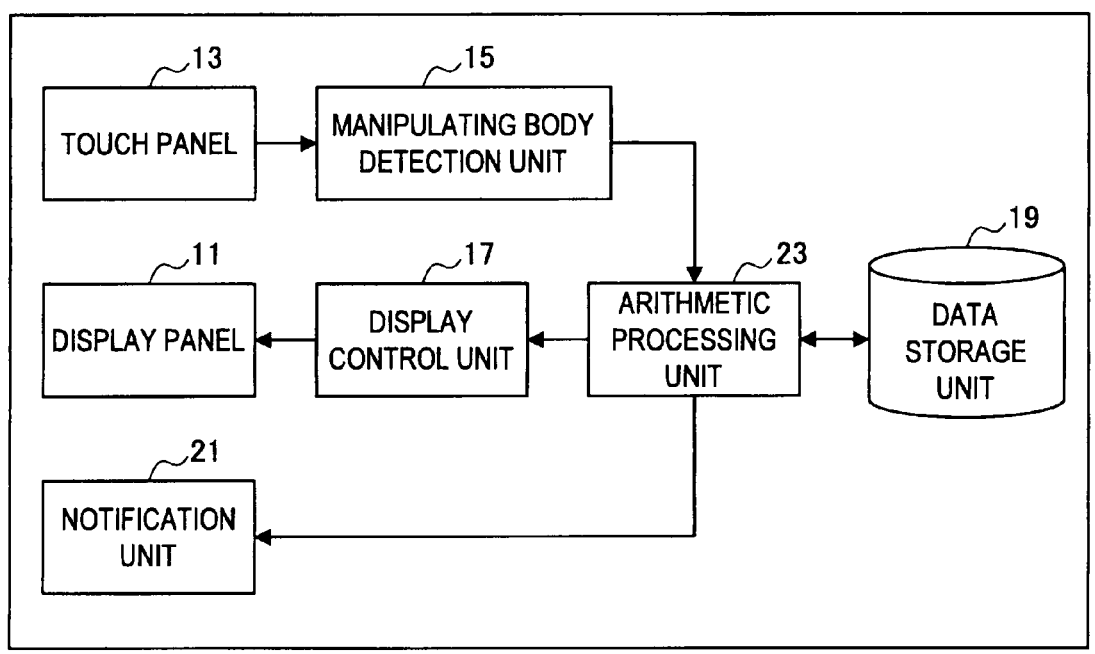
FIG. 1 is a block diagram showing a main functional configuration of an information processing device according to an embodiment of the present invention.

Hereinafter, preferred embodiments of the present invention will now be described in detail with reference to the appended drawings. In this specification and the drawings, elements having substantially the same functional configurations are denoted by the same reference numerals, and redundant description thereof is omitted.

[1. Configuration of Information Processing Device]

First, the information processing device according to an embodiment of the present invention will be described. FIG. 1 shows a main functional configuration of the information processing device.

As shown in FIG. 1, the information processing device includes a display panel 11, a touch panel 13, a manipulating body detection unit 15, a display control unit 17, a data storage unit 19, a notification unit 21, and an arithmetic processing unit 23. Here, the touch panel 13 is configured to overlap the display panel 11, but a touch pad configured separately from the display panel 11 may be provided in place of the touch panel 13.

The display panel 11 is constituted by a liquid crystal display or the like, and displays display items O (collectively referring to display items O1 to O3) divided into a plurality of layers. The touch panel 13 functions as a sensing region for sensing manipulating bodies P (collectively referring to manipulating bodies P1 to P3 to be described later such as a finger, a stylus, and the like), which make contact with the display panel 11. The touch panel 13 senses a contact state of the manipulating body P, and outputs a sensing signal to the manipulating body detection unit 15. The sensing signal may be output in response to a proximity state of the manipulating body P instead of the contact state of the manipulating body P.

The manipulating body detection unit 15 detects the number of manipulating bodies P along with a movement direction and a movement amount of a manipulating body P in response to the sensing signal input from the touch panel 13, and outputs a detection result to the arithmetic processing unit 23. The movement direction and the movement amount of the manipulating body P are detected on the basis of a sensing signal indicating contact/non-contact of the manipulating body P and a sensing signal indicating a contact position. In the case of a plurality of contact bodies P, for example, contact positions of the contact bodies P can be obtained as a center between the contact positions of the contact bodies P. The number of manipulating bodies P is detected on the basis of a distribution situation of sensing signals indicating the contact positions of the manipulating bodies P.

The display control unit 17 controls display by the display panel 11 in response to an instruction input from the arithmetic processing unit 23 in response to the contact state of the manipulating body P. The display control unit 17 controls the display panel 11 to perform scroll display S of display items O on the basis of a detection result of the number of manipulating bodies P along with the movement direction and the movement amount of the manipulating body P.

The data storage unit 19 stores data or the like of display items O divided into a plurality of layers. The display items O are managed in association with layers to which the display items O belong and upper and/or lower layers thereof. The data of the display items O includes layer data and display data.

If the layer transition of the scroll display S is made as will be described later, the notification unit 21 notifies the user of the layer transition by using an image (moving image/still image), audio, vibration, or the like, in response to an instruction input from the arithmetic processing unit 23.

The arithmetic processing unit 23 includes CPU, ROM, RAM, and the like. The CPU performs arithmetic processing necessary for controlling the operation of the information processing device by reading a program for executing an information processing method to be described later from the ROM and expanding and executing the program on the RAM.

The arithmetic processing unit 23 instructs the display control unit 17 to display display items O belonging to a predetermined layer. The arithmetic processing unit 23 instructs the display control unit 17 to perform scroll display S of the display items O on the basis of the detection result of the manipulating body P input from the manipulating body detection unit 15. Here, the arithmetic processing unit 23 instructs the display control unit 17 to perform scroll display S of display items O belonging to a layer corresponding to the number of manipulating bodies P in response to the detection result of the number of manipulating bodies P.

[2. Basic Operation of Information Processing Device]

Figure 2:
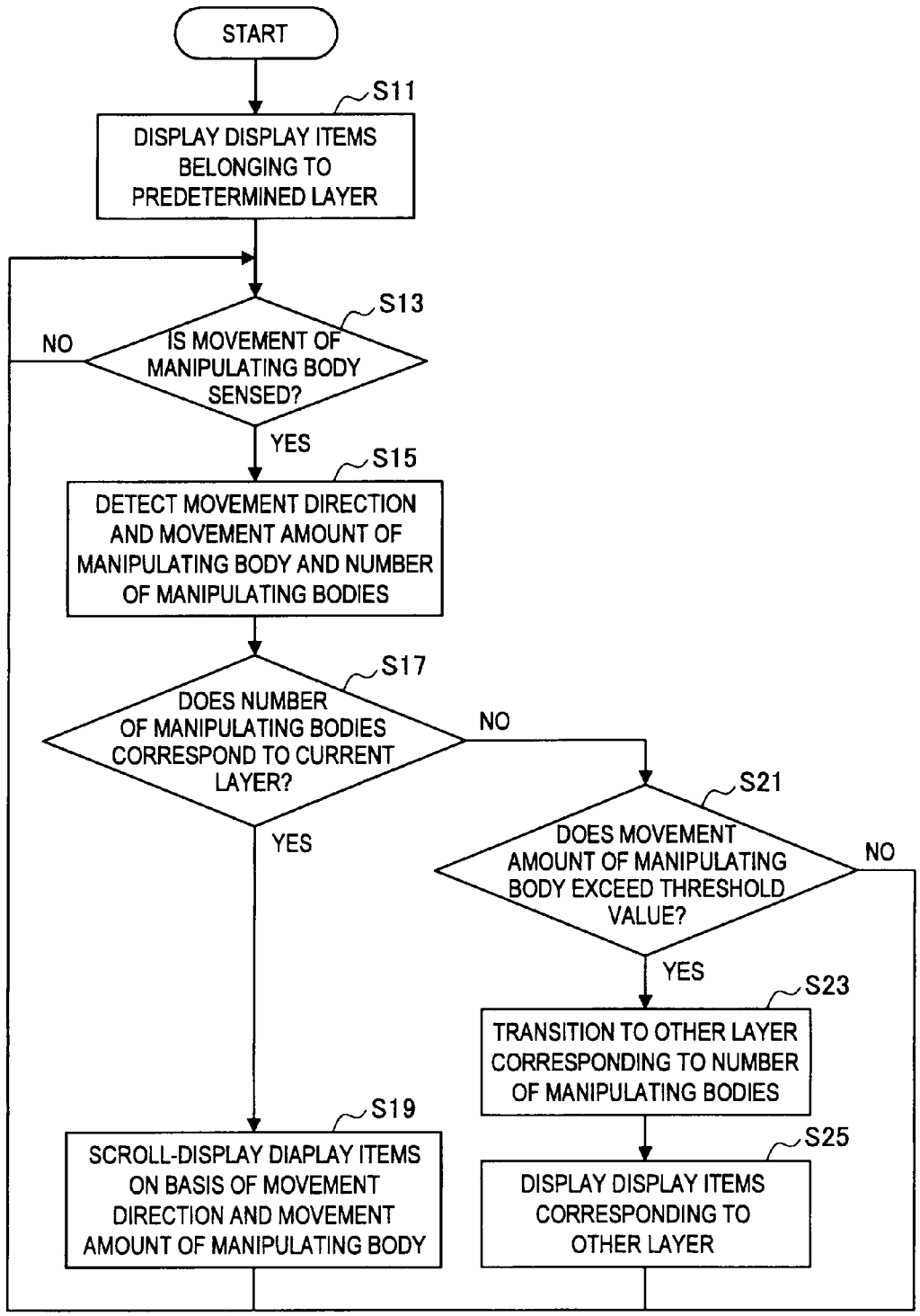
FIG. 2 is a flowchart showing a basic operation procedure of the information processing device according to an embodiment of the present invention.

FIG. 2 shows a basic operation procedure of the information processing device.

As shown in FIG. 2, the display control unit 17 controls the display panel 11 to display display items O belonging to a predetermined layer (step S11). When the movement of a manipulating body P is sensed on the touch panel 13 (S13), the manipulating body detection unit 15 detects the number of manipulating bodies P along with a movement direction and a movement amount of the manipulating body P on the basis of a sensing signal input from the touch panel 13 (S15).

The arithmetic processing unit 23 determines whether the number of manipulating bodies P corresponds to a current layer on the basis of a detection result of the number of manipulating bodies P (S17). Here, in an initial step, the predetermined layer corresponds to the current layer. If a determination result is positive, the arithmetic processing unit 23 instructs the display control unit 17 to perform scroll display S of display items O belonging to the current layer on the basis of detection results of the movement direction and the movement amount. If the instruction of the scroll display S is received, the display control unit 17 performs display control so that the scroll display S of the display items O belonging to the current layer (the predetermined layer) is performed (S19).

On the other hand, if the determination result of processing of step S17 is negative, the arithmetic processing unit 23 determines whether the movement amount of the manipulating body P exceeds a predetermined threshold value on the basis of the detection result of the movement amount (S21). If the movement amount exceeds the predetermined threshold value, the arithmetic processing unit 23 makes the layer transition of the scroll display S from the current layer (the predetermined layer) to another layer corresponding to the number of manipulating bodies P (S23). Further, the arithmetic processing unit 23 instructs the display control unit 17 to display display items O belonging to another layer. If a layer transition instruction is received, the display control unit 17 performs display control so that the display items O belonging to another layer are displayed (S25).

If the processing of step S19 or S25 is terminated, it is determined again whether the movement of the manipulating body P is sensed by returning to the processing of step S13. If the movement of manipulating bodies P whose number corresponds to another layer is sensed after the layer transition is made, the arithmetic processing unit 23 performs display control so that the scroll display S of display items O belonging to the current layer (another layer) is performed through the processing of steps S15 and S17 (S19).

[3. First Embodiment]

Next, the information processing device according to the first embodiment will be described. FIGS. 3A to 3F and FIGS. 4A to 4G respectively show application examples to photo browsing software and music playing software of the information processing device according to the first embodiment. In states ST associated with scroll display S among states ST shown in FIGS. 3A to 3F and FIGS. 4A to 4G, display items O are shown after the scroll display. In FIGS. 3A to 3F and FIGS. 4A to 4G, the number of manipulating bodies P is schematically shown along with a movement direction and a movement amount of a manipulating body P.

In the first embodiment, if the number of manipulating bodies P is changed during the scroll display S, the scroll display S of display items O belonging to a layer corresponding to the number of manipulating bodies P is performed after the change.

(Application Examples to Photo Browsing Software)

FIGS. 3A to 3F show the application examples to the photo browsing software. In the photo browsing software, for example, display items O of a first layer correspond to photo thumbnails O1, and display items O of a second layer of a high level correspond to albums O2. Here, for example, the thumbnails O1 are divided into the albums O2 corresponding to photographing dates of photos, and are managed. The first and second layers respectively correspond to the number of manipulating bodies P, "1" and "2."

Figure 3A:
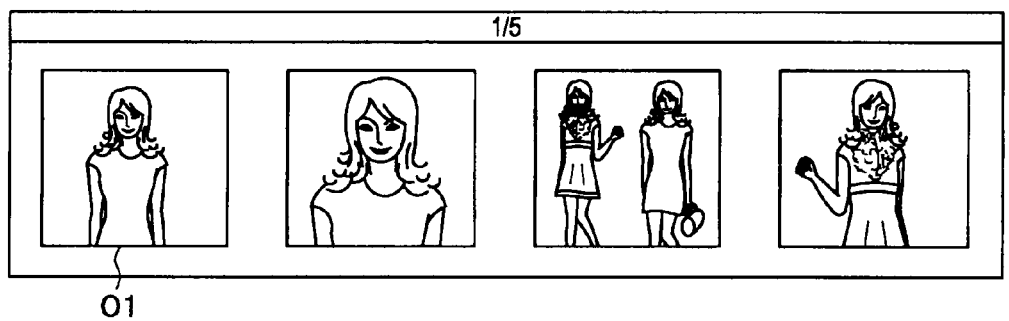
FIG. 3A is a diagram (1/6) showing an application example to photo browsing software.
Figure 3A:
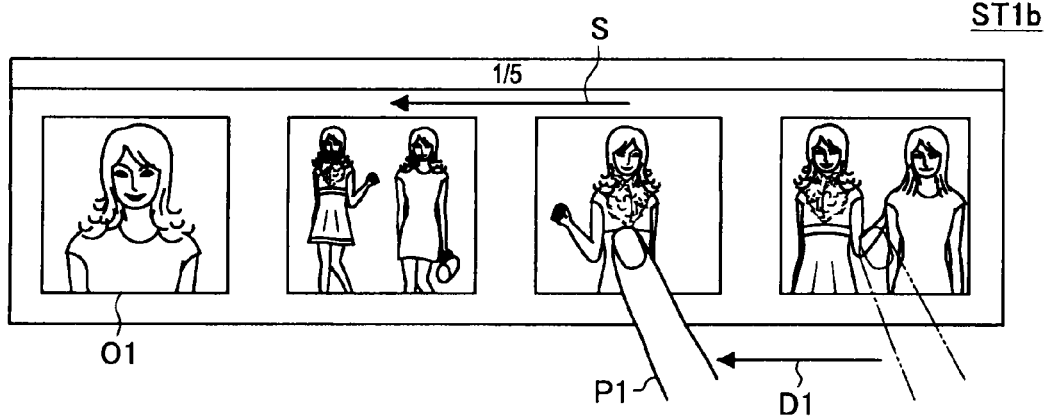
Figure 3A:
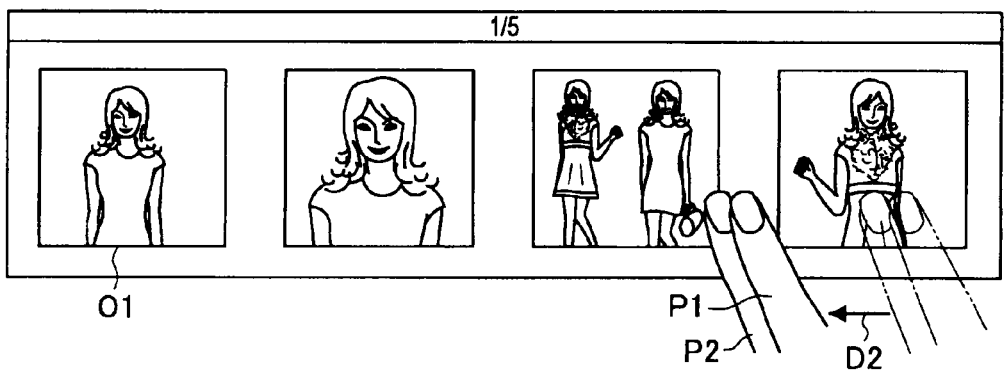

In state ST1a shown in FIG. 3A, for example, a plurality of thumbnails O1 belonging to an album O2 "1/5" are displayed in the left/right direction of the display panel 11. As shown in state ST1b, if one manipulating body P1 performs drag manipulation D1 in the left direction, the scroll display S of a plurality of thumbnails O1 is performed in the left direction.

Figure 3B:
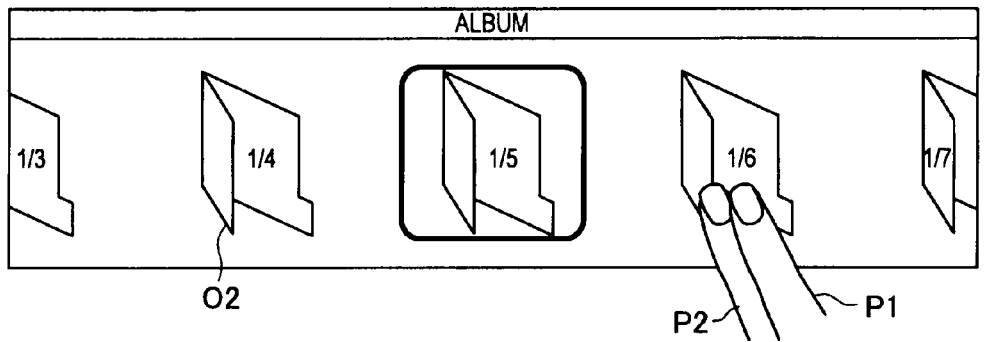
FIG. 3B is a diagram (2/6) showing an application example to the photo browsing software.
Figure 3B:
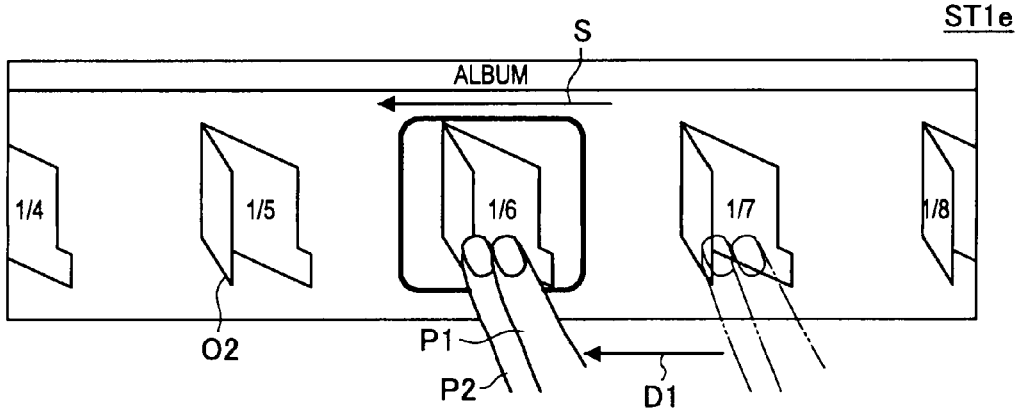
Figure 3B:
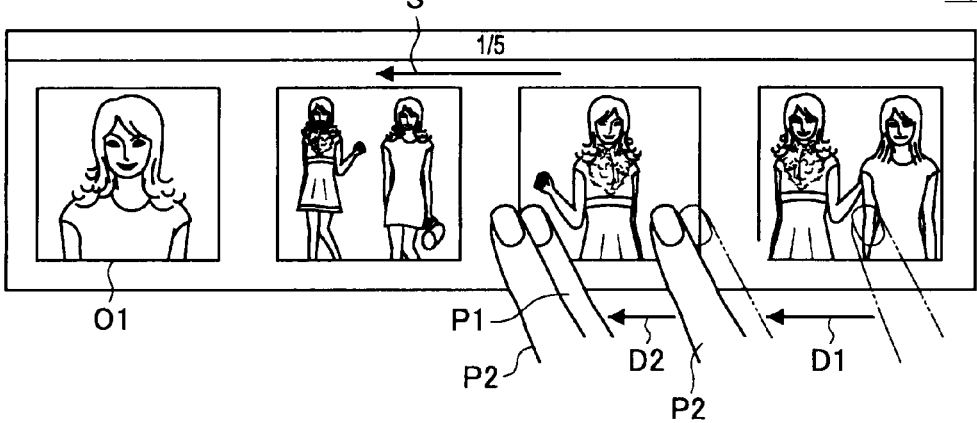

On the other hand, if two manipulating bodies P1 and P2 perform drag manipulation D2 associated with a predetermined movement amount in the left direction, as shown in state ST1c, in state ST1a, a plurality of albums O2 are displayed in the left/right direction as shown in state ST1d shown in FIG. 3B. Here, in state ST1d, the album O2 "1/5" to which the previously displayed thumbnails O1 belong is focused and displayed. Thereby, the display items O can be smoothly shifted from the display of thumbnails O1 to the display of albums O2 in a state in which a hierarchical relationship with the previously displayed thumbnails O1 is retained. As shown in state ST1e, the scroll display S of a plurality of albums O2 is performed in the left direction if the two manipulating bodies P1 and P2 perform the drag manipulation D1 in the left direction.

Figure 3C:
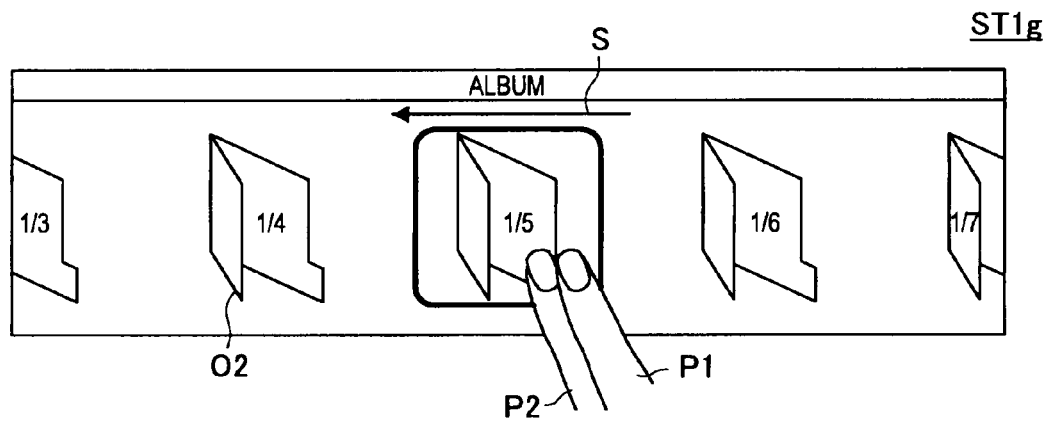
FIG. 3C is a diagram (3/6) showing an application example to the photo browsing software.
Figure 3C:
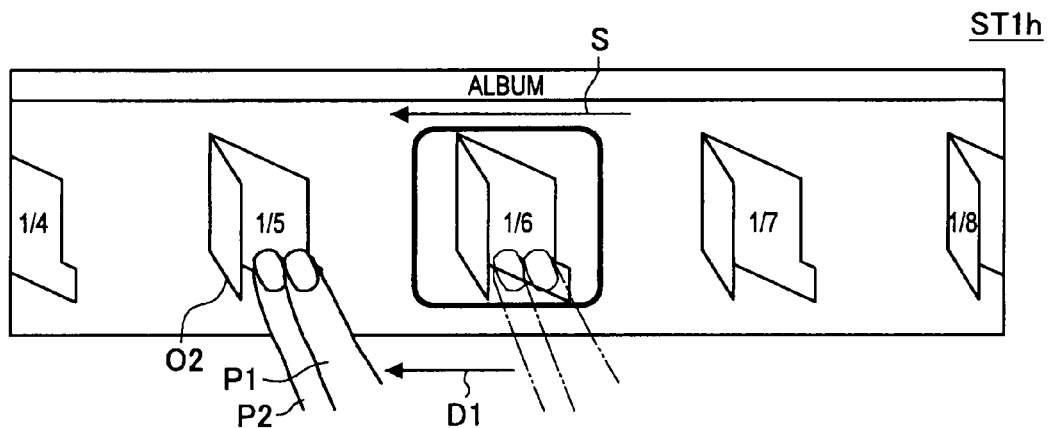
Figure 3C:
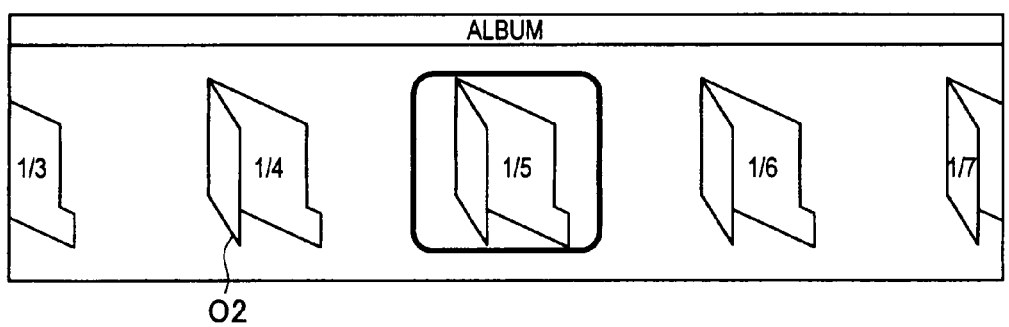

Returning to the state ST1b, during the drag manipulation D1 of state ST1b, if the one other manipulating body P2 makes contact with the display panel 11 and the two manipulating bodies P1 and P2 perform the drag manipulation D2 associated with a predetermined movement amount in the left direction as shown in state ST1f, a plurality of albums O2 are displayed in the left/right direction as shown in state ST1g shown in FIG. 3C. As shown in state ST1h, if the two manipulating bodies P1 and P2 perform the drag manipulation D1 in the left direction, the scroll display S of a plurality of albums O2 is performed in the left direction. Thereby, the scroll display S can be seamlessly shifted from the scroll display S of thumbnails O1 to the scroll display S of albums O2 without complex switching manipulation.

In state ST1i shown in FIG. 3C, a plurality of albums O2 are displayed in the left/right direction. As shown in state ST1j shown in FIG. 3D, if the two manipulating bodes P1 and P2 perform the drag manipulation D1 in the left direction, the scroll display S of a plurality of albums O2 is performed in the left direction.

Figure 3D:
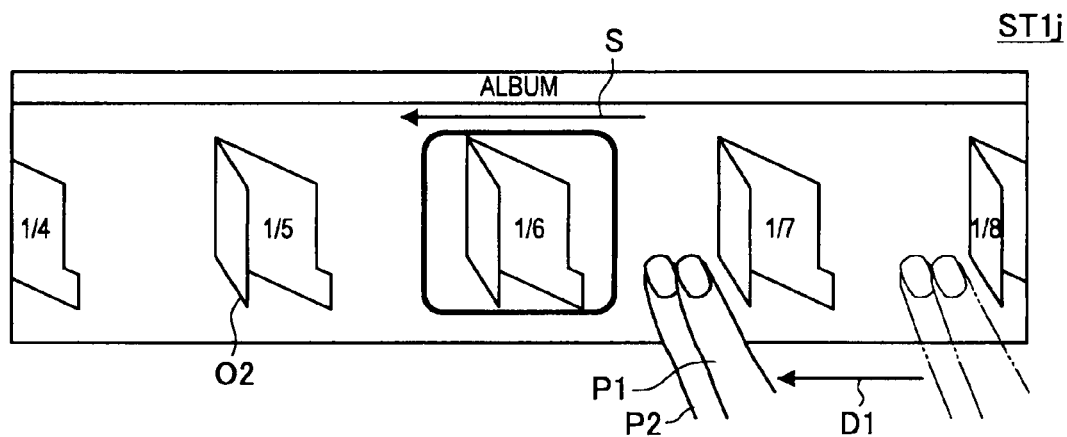
FIG. 3D is a diagram (4/6) showing an application example to the photo browsing software.
Figure 3D:
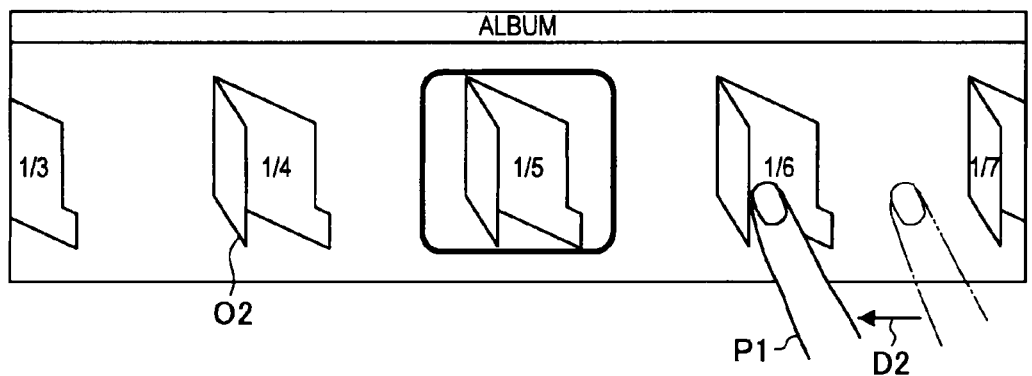
Figure 3D:
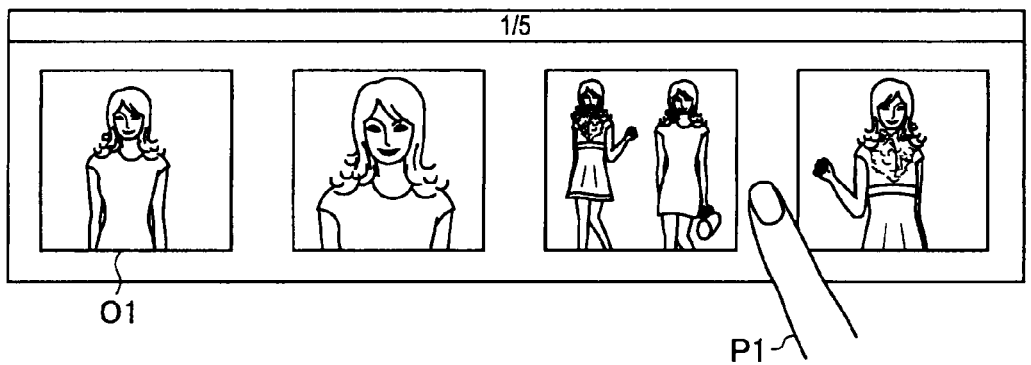

On the other hand, if the one manipulating body P1 performs the drag manipulation D2 associated with a predetermined movement amount in the left direction, as shown in state ST1k shown in FIG. 3D, in state ST1i shown in FIG. 3C, a plurality of thumbnails O1 are displayed in the left/right direction as shown in state ST11. Here, in state ST11, for example, thumbnails O1 belonging to the previously focused and displayed album O2 "1/5" are displayed. Thereby, the display items O can be smoothly shifted from the display of albums O2 to the display of thumbnails O1 in a state in which a hierarchical relationship with the previously displayed album O2 is retained. As shown in state ST1m shown in FIG. 3E, if the one manipulating body P1 performs the drag manipulation D1 in the left direction, the scroll display S of a plurality of thumbnails O1 is performed in the left direction.

Figure 3E:
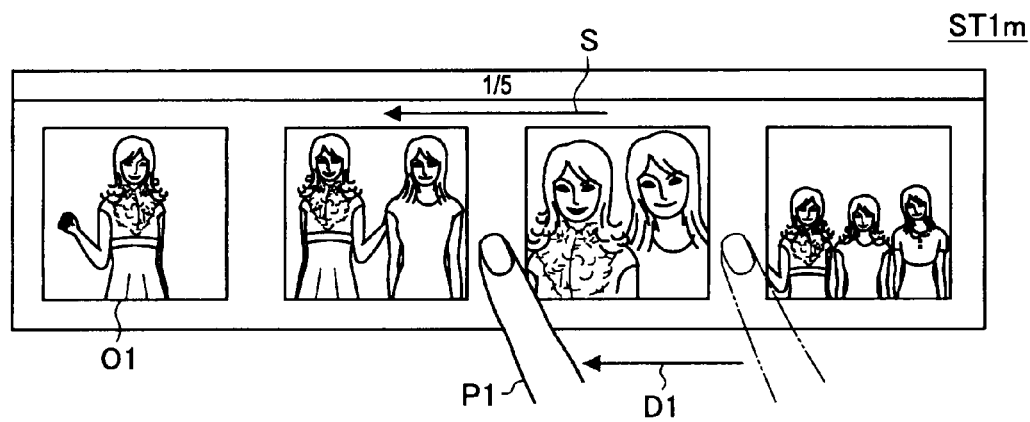
FIG. 3E is a diagram (5/6) showing an application example to the photo browsing software.
Figure 3E:
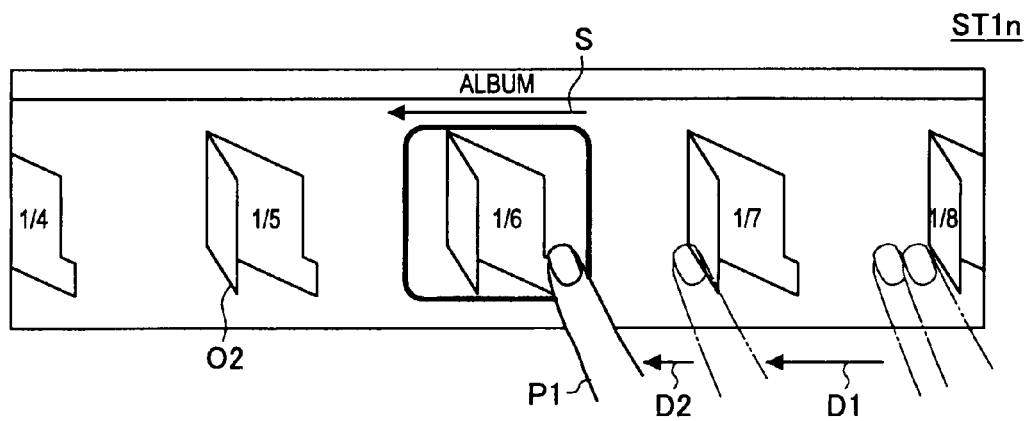
Figure 3E:
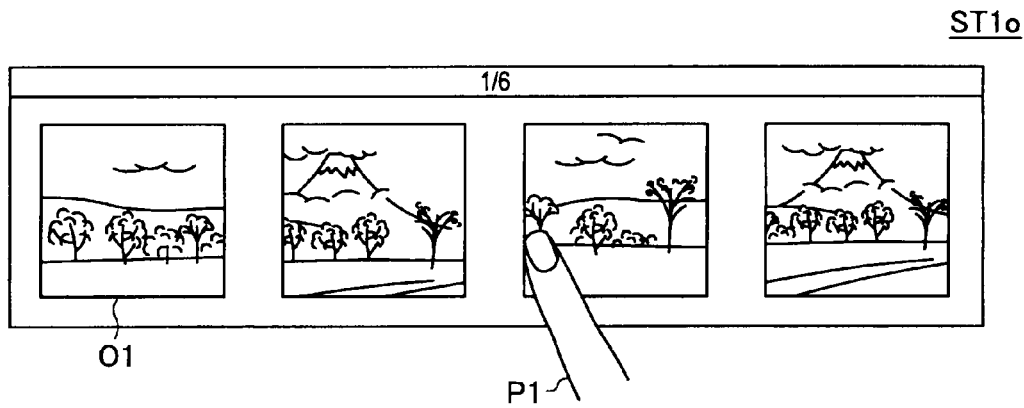

Returning to state STU shown in FIG. 3D, during the drag manipulation D1 of state STU, if the one manipulating body P2 (or manipulating body P1) is separated from the display panel 11 and the one manipulating body P1 performs the drag manipulation D2 associated with a predetermined movement amount in the left direction as shown in state ST1n shown in FIG. 3E, a plurality of thumbnails O1 are displayed in the left/right direction as shown in state ST1o. Here, in state ST1o, for example, thumbnails O1 belonging to a previously focused and displayed album O2 "1/6" are displayed. As shown in state ST1p shown in FIG. 3F, if the one manipulating body P1 performs the drag manipulation D1 in the left direction, the scroll display S of a plurality of thumbnails O1 is performed in the left direction. Thereby, the scroll display S can be seamlessly shifted from the scroll display S of albums O2 to the scroll display S of thumbnails O1 without complex switching manipulation.

Figure 3F:
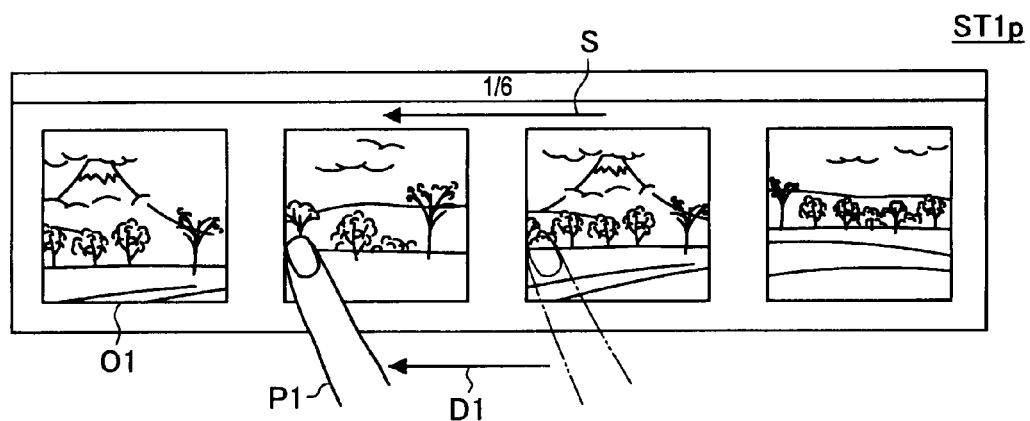
FIG. 3F is a diagram (6/6) showing an application example to the photo browsing software.
Figure 3F:
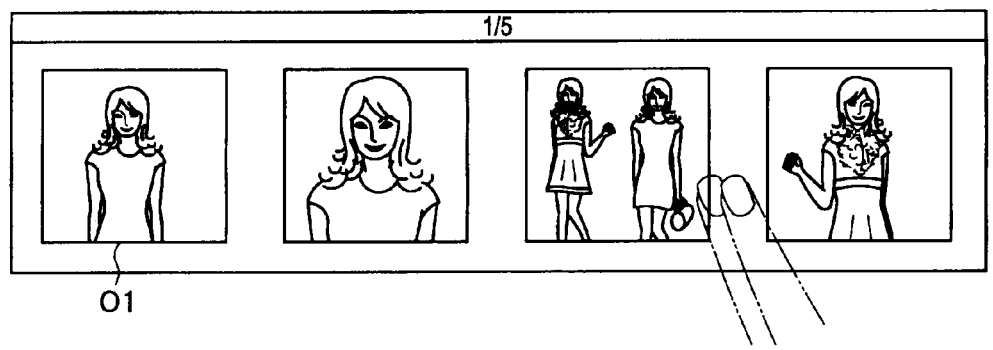

On the other hand, if the two manipulating bodies P1 and P2 are simultaneously separated from the display panel 11 during the drag manipulation D1 of state ST1j shown in FIG. 3D, a plurality of thumbnails O1 are displayed in the left/right direction as shown in state ST1q shown in FIG. 3F. Here, in state ST1q, for example, thumbnails O1 belonging to the previously focused and displayed album O2 "1/5" are displayed. Thereby, the display items O can be smoothly shifted from the display of albums O2 to the display of thumbnails O1 in a state in which a hierarchical relationship with the previously displayed album O2 is retained.

If tap manipulation is performed for any thumbnail O1 in a state in which a plurality of thumbnails O1 are displayed, the thumbnail O1 serving as a tap manipulation target is selected and a photo corresponding to the selected thumbnail O1 is displayed. Also, if tap manipulation is performed for any album O2 in a state in which a plurality of albums O2 are displayed, a plurality of thumbnails O1 belonging to the album O2 serving as a tap manipulation target may be displayed. The case where the drag manipulations D1 and D2 are performed in the left direction has been described above, but the drag manipulations D1 and D2 may be performed in the right direction, and may be performed by switching to the left/right direction. In particular, before/after the layer transition, the drag manipulations D1 and D2 may be performed in different directions.

(Application Examples to Music Playing Software)

FIGS. 4A to 4G show the application examples to the music playing software. In the music playing software, for example, display items O of a first layer correspond to musical pieces O1, display items O of a second layer of a high level correspond to albums O2, and display items O of a third layer of a higher level correspond to artists O3. Here, the musical pieces O1 are divided into the albums O2 recording the musical pieces O1, and the albums O2 are divided into the artists O3 creating the albums O2, and are managed. The first, second, and third layers respectively correspond to the number of manipulating bodies P, "1," "2," and "3."

In state ST2a shown in FIG. 4A, for example, a plurality of musical pieces O1 belonging to an album O2 "Aa" of an artist O3 "A" are displayed in an up/down direction. If one manipulating body P1 performs drag manipulation D1 in state ST2a, the scroll display S of a plurality of musical pieces O1 is performed in the up direction as shown in state ST2b.

Figure 4B:
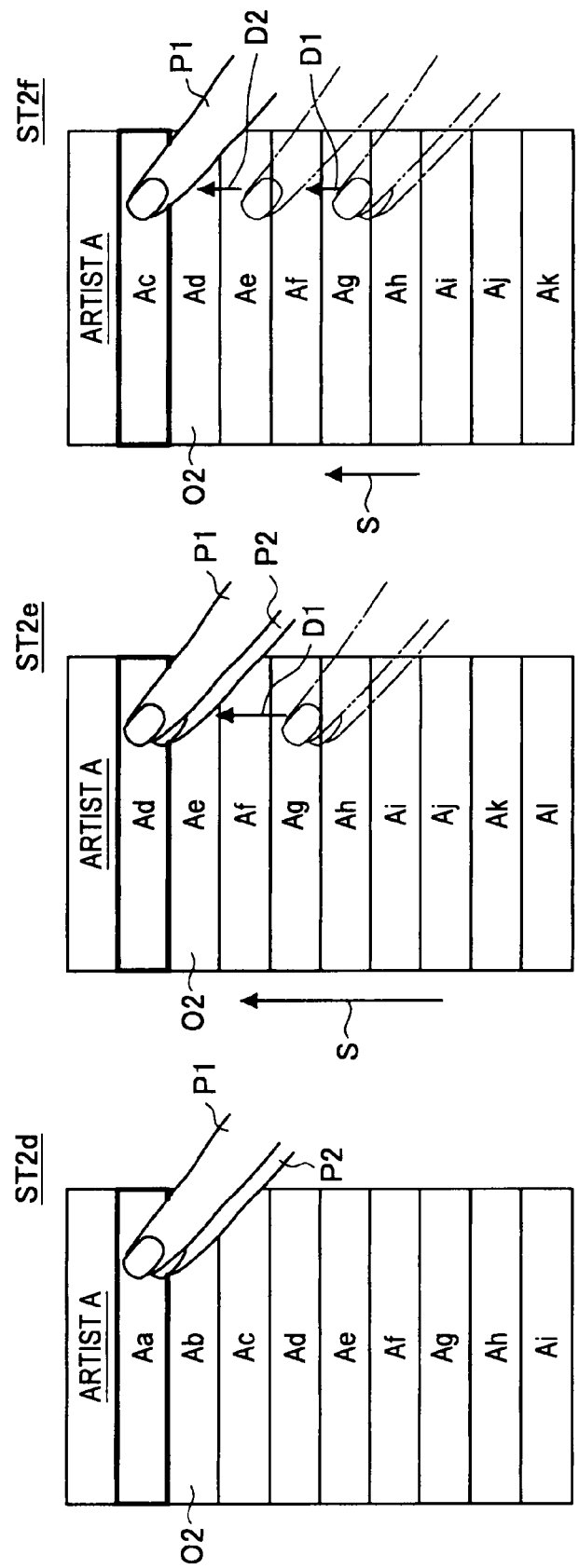
FIG. 4B is a diagram (2/7) showing an application example to the music playing software.

During the drag manipulation D1 of state ST2b, if one other manipulating body P2 makes contact with the display panel 11 and the two manipulating bodies P1 and P2 perform drag manipulation D2 associated with a predetermined movement amount in the up direction as shown in state ST2c, a plurality of albums O2 of the artist O3 "A" are displayed in the top direction as shown in state ST2d shown in FIG. 4B. Here, in state ST2d, the previously displayed album O2 "Aa" is focused and displayed. As shown in state ST2e, if the two manipulating bodies P1 and P2 perform the drag manipulation D1 in the up direction, the scroll display S of a plurality of albums O2 is performed in the up direction.

Figure 4C:
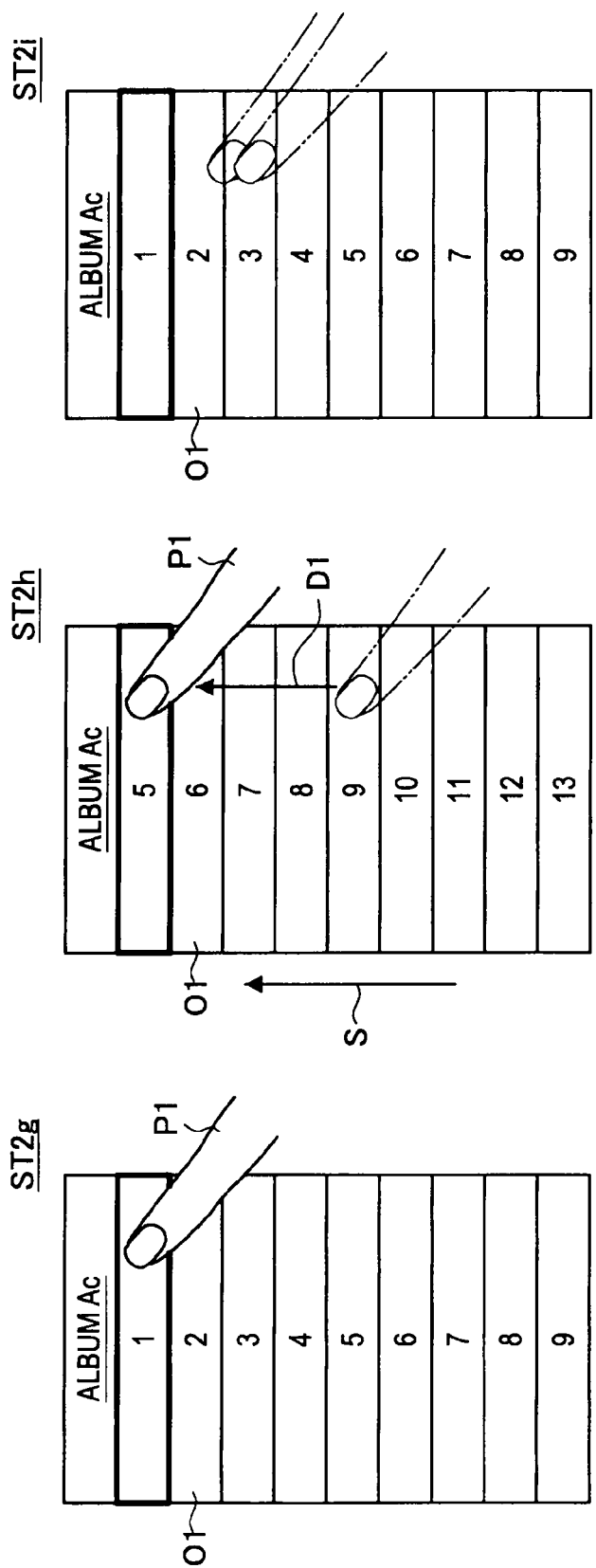
FIG. 4C is a diagram (3/7) showing an application example to the music playing software.

During the drag manipulation D1 of state ST2e, if the one manipulating body P2 (or manipulating body P1) is separated from the display panel 11 and the one manipulating body P1 performs the drag manipulation D2 associated with a predetermined movement amount in the up direction as shown in state ST2f, a plurality of musical pieces O1 are displayed in the up/down direction as shown in state ST2g shown in FIG. 4C. Here, in state ST2g, for example, musical pieces O1 belonging to a previously focused and displayed album O2 "Ac" are displayed. As shown in state ST2h, if the one manipulating body P1 performs the drag manipulation D1 in the up direction, the scroll display S of a plurality of musical pieces O1 is performed in the up direction.

On the other hand, if the two manipulating bodies P1 and P2 are simultaneously separated from the display panel 11 during the drag manipulation D1 of state ST2e by returning to state ST2e shown in FIG. 4B, a plurality of musical pieces O1 are displayed in the up/down direction as shown in state ST2i shown in FIG. 4C. Here, in state ST2i, for example, musical pieces O1 belonging to the previously focused and displayed album O2 "Ac" are displayed.

On the other hand, during the drag manipulation D1 of state ST2e shown in FIG. 4B, if one other manipulating body P3 makes contact with the display panel 11 and the three manipulating bodies P1, P2, and P3 perform the drag manipulation D2 associated with a predetermined movement amount in the up direction as shown in state ST2j shown in FIG. 4D, a plurality of artists O3 are displayed in the up/down direction as shown in state ST2k. As shown in state ST21, if the three manipulating bodies P1, P2, and P3 perform the drag manipulation D1 in the up direction, the scroll display S of a plurality of artists O3 is performed in the up direction.

Figure 4E:
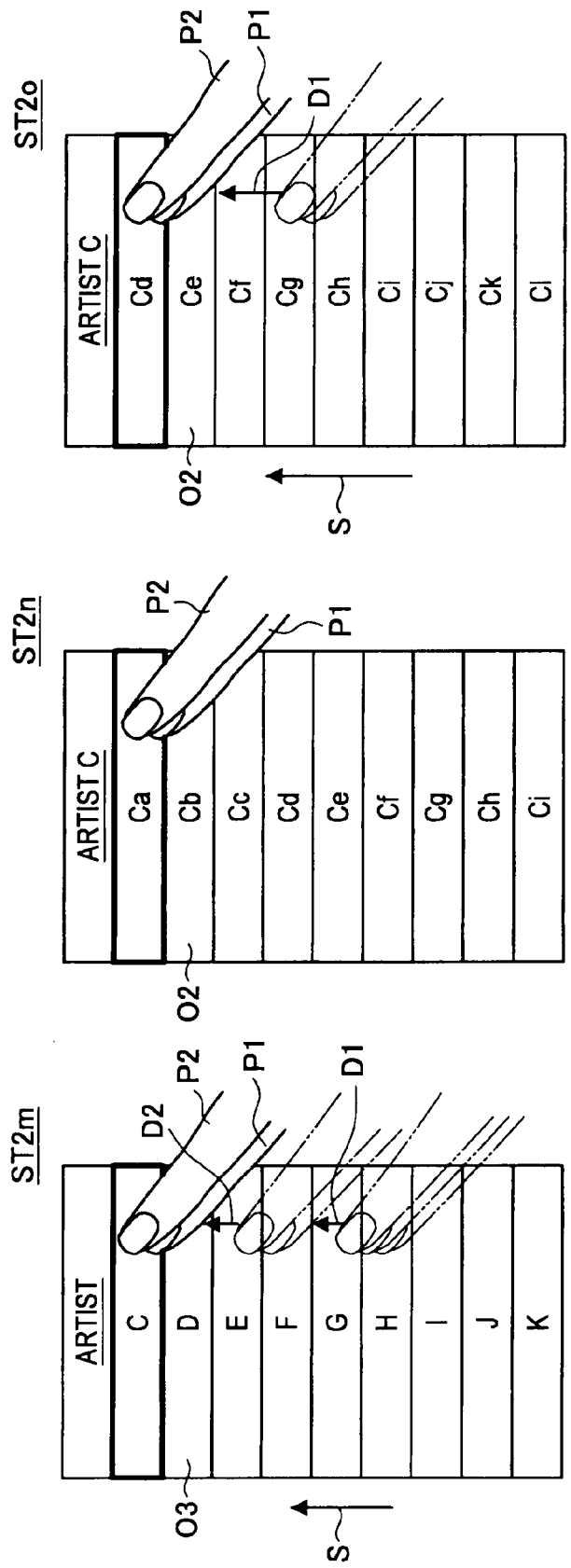
FIG. 4E is a diagram (5/7) showing an application example to the music playing software.

During the drag manipulation D1 of state ST2l, if the one manipulating body P3 (or manipulating body P1 or P2) is separated from the display panel 11 and the two manipulating bodies P1 and P2 perform the drag manipulation D2 associated with a predetermined movement amount in the up direction as shown in state ST2m shown in FIG. 4E, a plurality of albums O2 are displayed in the up/down direction as shown in state ST2n. Here, in state ST2n, for example, albums O2 belonging to a previously focused and displayed artist O3 "C" are displayed. As shown in state ST2o, if the two manipulating bodies P1 and P2 perform the drag manipulation D1 in the up direction, the scroll display S of a plurality of albums O2 is performed in the up direction.

Figure 4F:
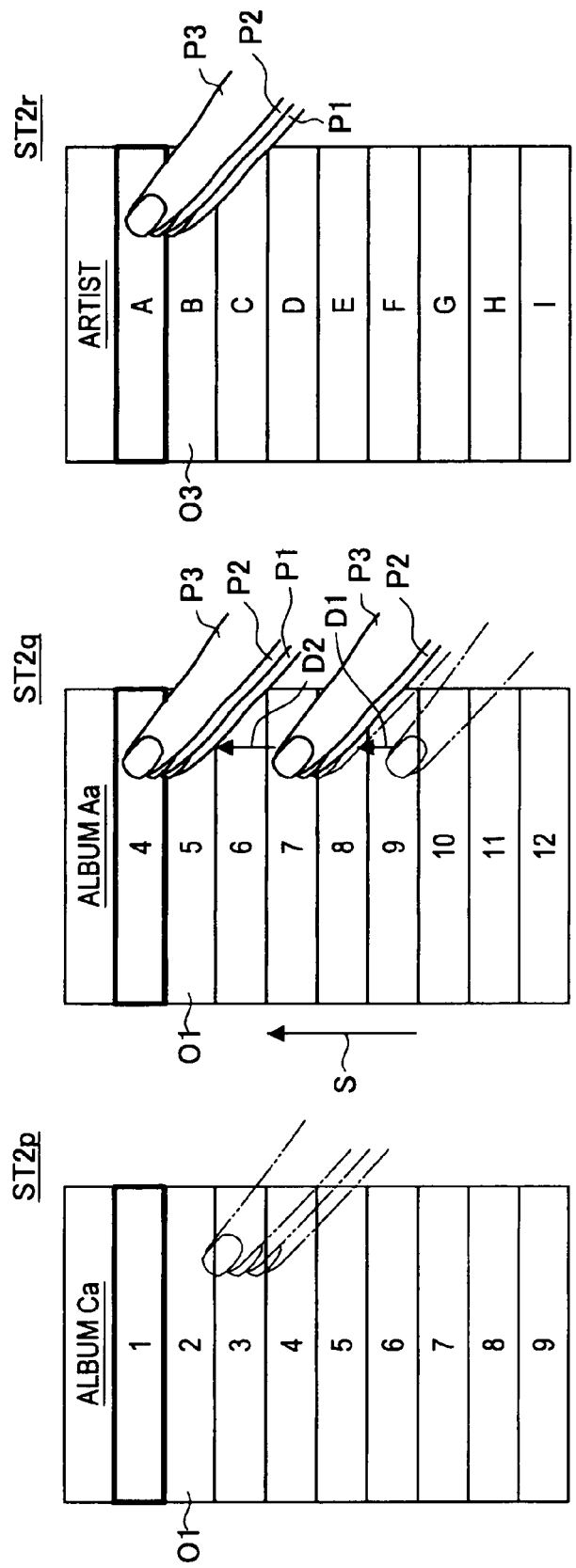
FIG. 4F is a diagram (6/7) showing an application example to the music playing software.
Figure 4G:
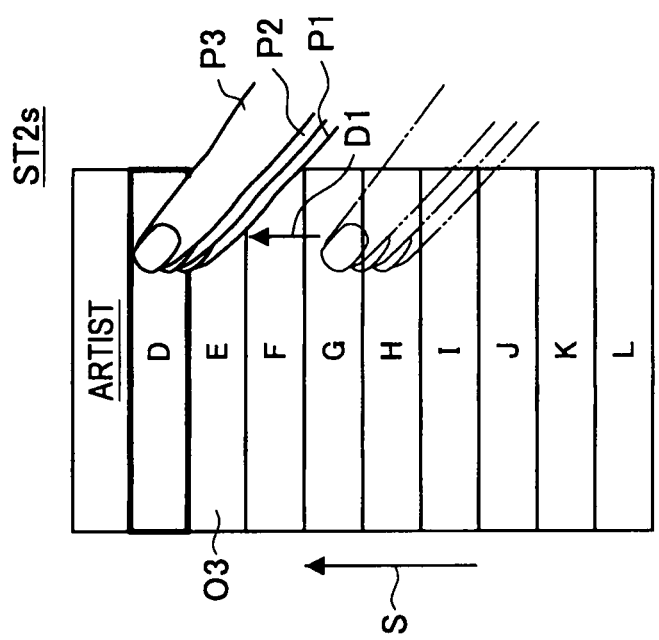
FIG. 4G is a diagram (7/7) showing an application example to the music playing software.

On the other hand, if the three manipulating bodies P1, P2, and P3 are simultaneously separated from the display panel 11 during the drag manipulation D1 of state ST2l, a plurality of musical pieces O1 are displayed in the up/down direction as shown in state ST2p shown in FIG. 4F. Here, in state ST2p, for example, musical pieces O1 of a predetermined album O2 belonging to the previously focused and displayed artist O3 "C" are displayed. For example, the predetermined album O2 may be a first album O2 "Ca" divided into the artist O3 "C," may be the previously displayed album O2, or may be a recently played album O2 or an album O2 whose play frequency is high.

Returning to state ST2b shown in FIG. 4A, during the drag manipulation D1 of state ST2b, if the two other manipulating bodies P1 and P2 make contact with the display panel 11 and the three manipulating bodies P1, P2, and P3 perform the drag manipulation D2 associated with a predetermined movement amount in the up direction as shown in state ST2q shown in FIG. 4F, a plurality of artists O3 are displayed in the up/down direction as shown in state ST2r. As shown in state ST2s, if the three manipulating bodies P1, P2, and P3 perform the drag manipulation D1 in the up direction, the scroll display S of a plurality of artists O3 is performed in the up direction.

If tap manipulation is performed for any musical piece O1 in a state in which a plurality of musical pieces O1 are displayed, the musical piece O1 serving as a tap manipulation target is selected and the selected musical piece O1 is played. Also, if tap manipulation is performed for any album O2 in a state in which a plurality of albums O2 are displayed, a plurality of musical pieces O1 belonging to the album O2 serving as a tap manipulation target may be displayed. Also, if tap manipulation is performed for any artist O3 in a state in which a plurality of artists O3 are displayed, a plurality of albums O2 belonging to the artist O3 serving as a tap manipulation target may be displayed. The case where the drag manipulations D1, D2, and D3 are performed in the up direction has been described above, but the drag manipulations D1, D2, and D3 may be performed in the down direction, and may be performed by switching to the up/down direction. In particular, before/after the layer transition, the drag manipulations D1, D2, and D3 may be performed in different directions.

[4. Second Embodiment]

Next, the information processing device according to the second embodiment will be described. FIGS. 5A to 5F and FIGS. 6A to 6C respectively show application examples to list search software and web browsing software of the information processing device according to the second embodiment. In states ST associated with scroll display S among states ST shown in FIGS. 5A to 5F and FIGS. 6A to 6C, display items O are shown after the scroll display. In FIGS. 5A to 5F and FIGS. 6A to 6C, the number of manipulating bodies P is schematically shown along with a movement direction and a movement amount of a manipulating body P.

In the second embodiment, if the number of manipulating bodies P is changed during the scroll display S, the scroll display S of display items O belonging to an upper layer and a lower layer is performed if the number of manipulating bodies P after the change corresponds to the lower layer, and the scroll display S of display items O belonging to the upper layer is performed if the number of manipulating bodies P after the change corresponds to the upper layer.

(Application Examples to List Search Software)

FIGS. 5A to 5F show the application examples to the list search software. In the list search software, for example, display items O of a first layer correspond to personal names O1 registered in a list, and display items O of a second layer of a high level correspond to indices O2 for alphabetical classification. Here, the personal names O1 are divided into indices O2 corresponding to initials of the personal names O1, and are managed. The first and second layers respectively correspond to the number of manipulating bodies P, "1" and "2."

Figure 5A:
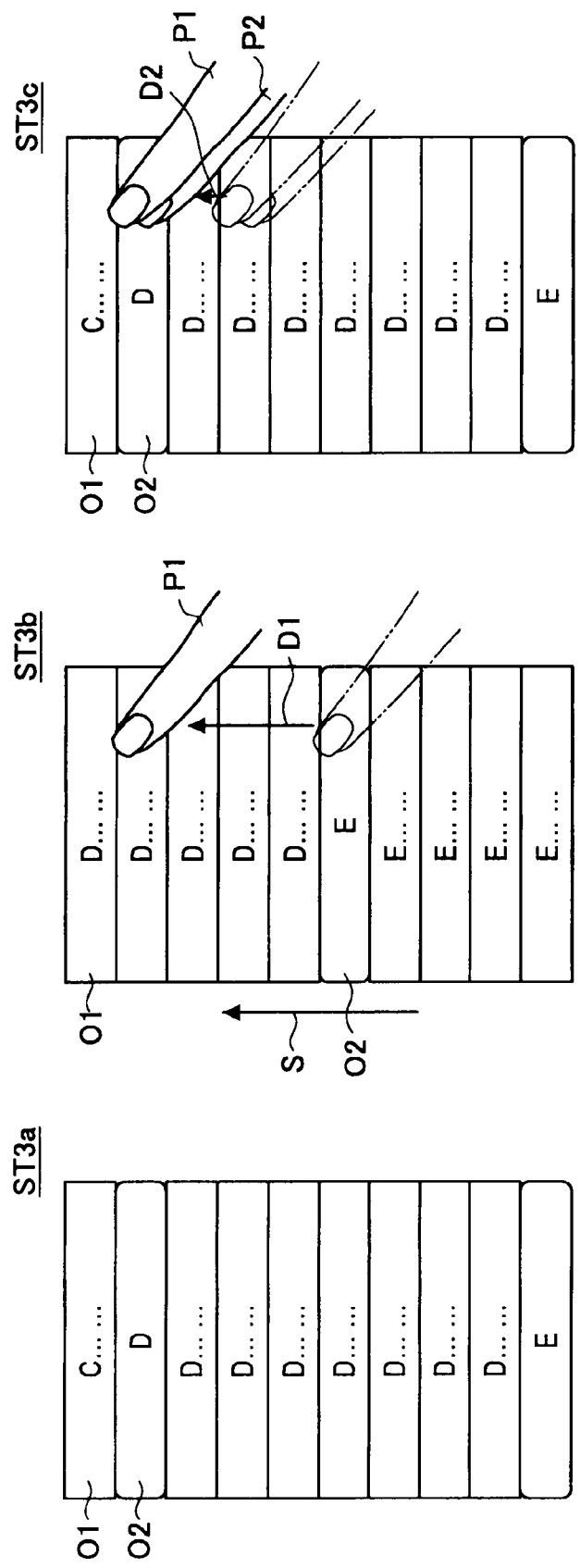
FIG. 5A is a diagram (1/6) showing an application example to list search software.

In state ST3a shown in FIG. 5A, for example, a plurality of personal names O1 and indices O2 are displayed in the up/down direction of the display panel 11 in order of a personal name O1 belonging to an index O2 "C," an index O2 "D," a plurality of personal names O1 belonging to the index O2 "D," and an index O2 "E." As shown in state ST3b, if one manipulating body P1 performs drag manipulation D1 in the up direction, the scroll display S of a plurality of personal names O1 and indices O2 is performed in the up direction.

On the other hand, if two manipulating bodies P1 and P2 perform drag manipulation D2 associated with a movement amount exceeding a predetermined threshold value in the up direction, as shown in state ST3c, in state ST3a, a plurality of indices O2 are displayed in the up/down direction, for example, in order of indices O2 "A" to "H" as shown in state ST3d shown in FIG. 5B. Here, in state ST3d, the index O2 "D" to which the personal names O1 previously displayed in the center of the display panel 11 belong is focused and displayed. Thereby, the display items O can be smoothly shifted from the display of personal names O1 and indices O2 to the display of only indices O2 in a state in which a hierarchical relationship with the previously displayed personal names O1 is retained. As shown in state ST3e, if the two manipulating bodies P1 and P2 perform the drag manipulation D1 in the up direction, the scroll display S of a plurality of indices O2 is performed in the up direction.

Returning to the state ST3b shown in FIG. 5A, during the drag manipulation D1 of state ST3b, if the one other manipulating body P2 makes contact with the display panel 11 and the two manipulating bodies P1 and P2 perform the drag manipulation D2 associated with a predetermined movement amount in the up direction as shown in state ST3f shown in FIG. 5B, a plurality of indices O2 are displayed in the up/down direction as shown in state ST3g shown in FIG. 5C. As shown in state ST3h, if the two manipulating bodies P1 and P2 perform the drag manipulation D1 in the up direction, the scroll display S of a plurality of indices O2 is performed in the up direction. Thereby, the scroll display S can be seamlessly shifted from the scroll display S of personal names O1 and indices O2 to the scroll display S of only indices O2 without complex switching manipulation.

In state ST3i shown in FIG. 5C, a plurality of indices O2 are displayed in the up/down direction. As shown in state ST3j shown in FIG. 5D, if the two manipulating bodies P1 and P2 perform the drag manipulation D1 in the up direction, the scroll display S of a plurality of indices O2 is performed in the up direction.

Figure 5D:
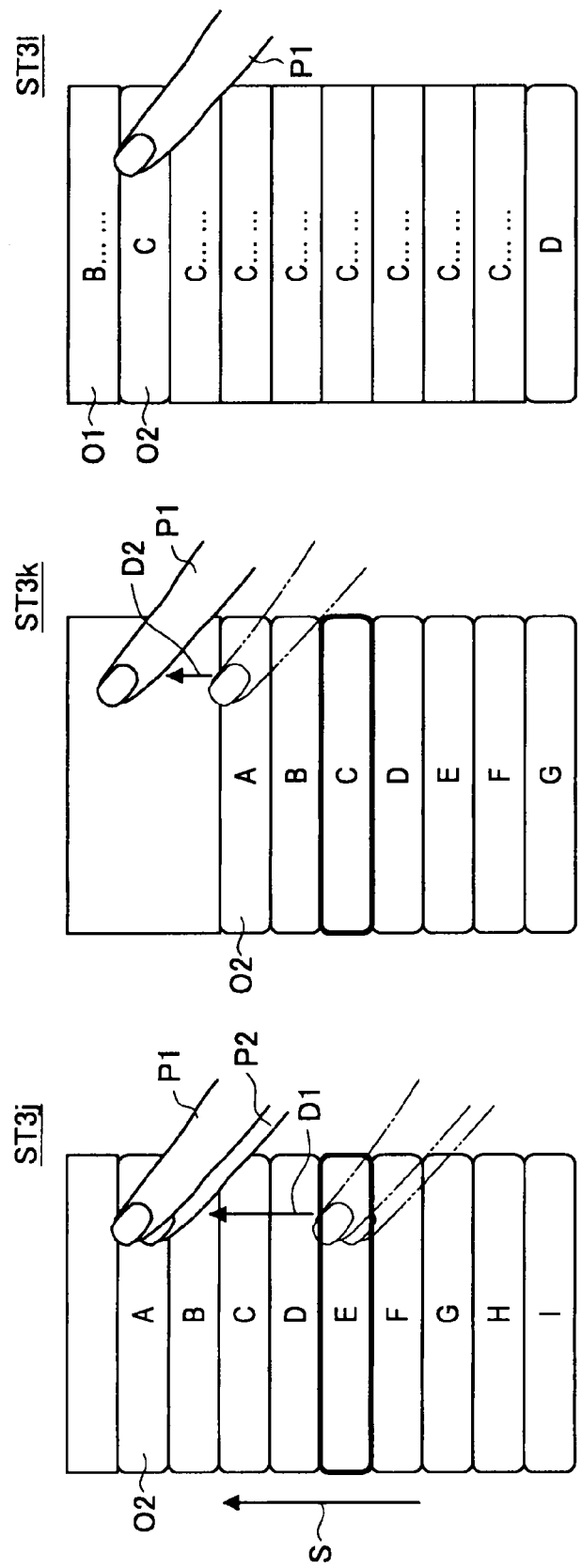
FIG. 5D is a diagram (4/6) showing an application example to the list search software.

On the other hand, if the one manipulating body P1 performs the drag manipulation D2 associated with a predetermined movement amount in the up direction, as shown in state ST3k shown in FIG. 5D, in state ST3i shown in FIG. 5C, a plurality of personal names O1 and indices O2 are displayed in the up/down direction as shown in state ST3l. Here, in state ST3l, for example, personal names O1 belonging to the previously focused and displayed index O2 "C" are arranged in the center of the display panel 11. Thereby, the display items O can be smoothly shifted from the display of only indices O2 to the display of personal names O1 and indices O2 in a state in which a hierarchical relationship with the previously displayed index O2 is retained. As shown in state ST3m shown in FIG. 5E, if the one manipulating body P1 performs the drag manipulation D1 in the up direction, the scroll display S of a plurality of personal names O1 and indices O2 is performed in the up direction.

Returning to state ST3j shown in FIG. 5D, during the drag manipulation D1 of state ST3j, if the one manipulating body P2 (or manipulating body P1) is separated from the display panel 11 and the one manipulating body P1 performs the drag manipulation D2 associated with a movement amount exceeding a predetermined threshold value in the up direction as shown in state ST3n shown in FIG. 5E, a plurality of personal names O1 and indices O2 are displayed in the up/down direction as shown in state ST3o. Here, in state ST3o, for example, personal names O1 belonging to a previously focused and displayed index O2 "H" are arranged in the center of the display panel 11. As shown in state ST3p shown in FIG. 5F, if the one manipulating body P1 performs the drag manipulation D1 in the up direction, the scroll display S of a plurality of personal names O1 and indices O2 is performed in the up direction. Thereby, the scroll display S can be seamlessly shifted from the scroll display S of only indices O2 to the scroll display S of personal names O1 and indices O2 without complex switching manipulation.

Figure 5F:
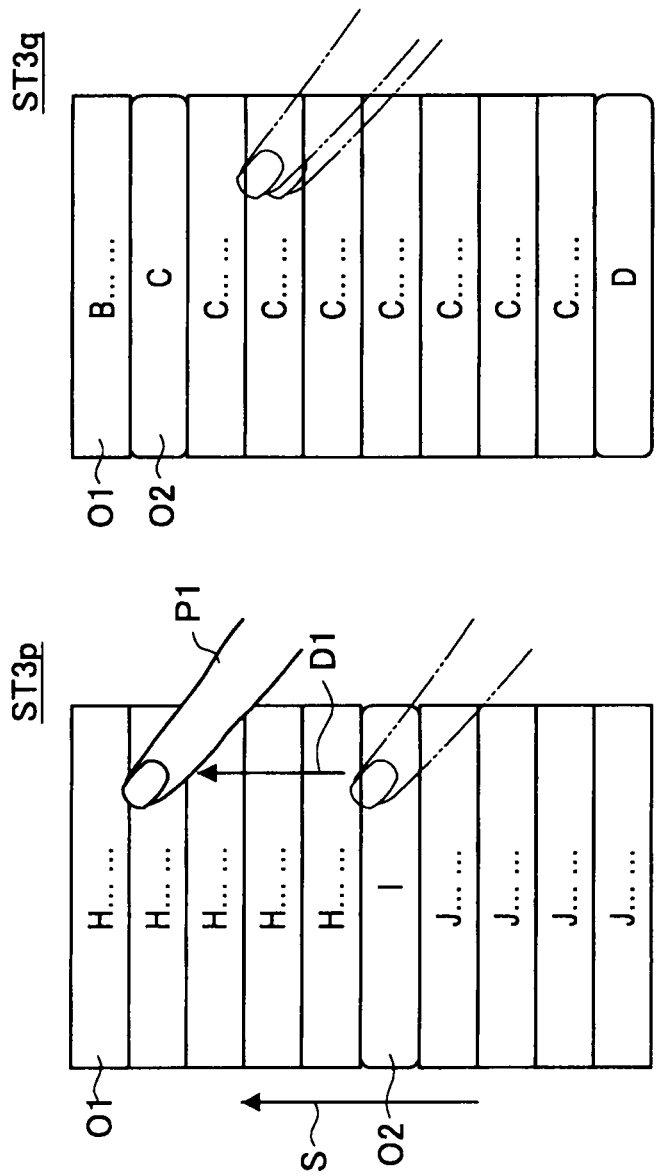
FIG. 5F is a diagram (6/6) showing an application example to the list search software.

On the other hand, if the two manipulating bodies P1 and P2 are simultaneously separated from the display panel 11 during the drag manipulation D1 of state ST3j shown in FIG. 5D, a plurality of personal names O1 and indices O2 are displayed in the up/down direction as shown in state ST3q shown in FIG. 5F. Here, in state ST3q, for example, personal names O1 belonging to the previously focused and displayed index O2 "C" are arranged in the center of the display panel 11. Thereby, the display items O can be smoothly shifted from the display of only indices O2 to the display of personal names O1 and indices O2 in a state in which a hierarchical relationship with the previously displayed index O2 is retained.

If tap manipulation is performed for any personal name O1 in a state in which a plurality of personal names O1 are displayed, the personal name O1 serving as a tap manipulation target is selected and detailed information or the like of a selected person is displayed. Also, if tap manipulation is performed for any index O2 in a state in which only a plurality of indices O2 are displayed, a plurality of personal names O1 belonging to the index O2 serving as a tap manipulation target may be displayed. The case where the drag manipulations D1 and D2 are performed in the up direction has been described above, but the drag manipulations D1 and D2 may be performed in the down direction, and may be performed by switching to the up/down direction. In particular, before/after the layer transition, the drag manipulations D1 and D2 may be performed in different directions.

(Application Examples to Web Browsing Software)

Figure 6B:
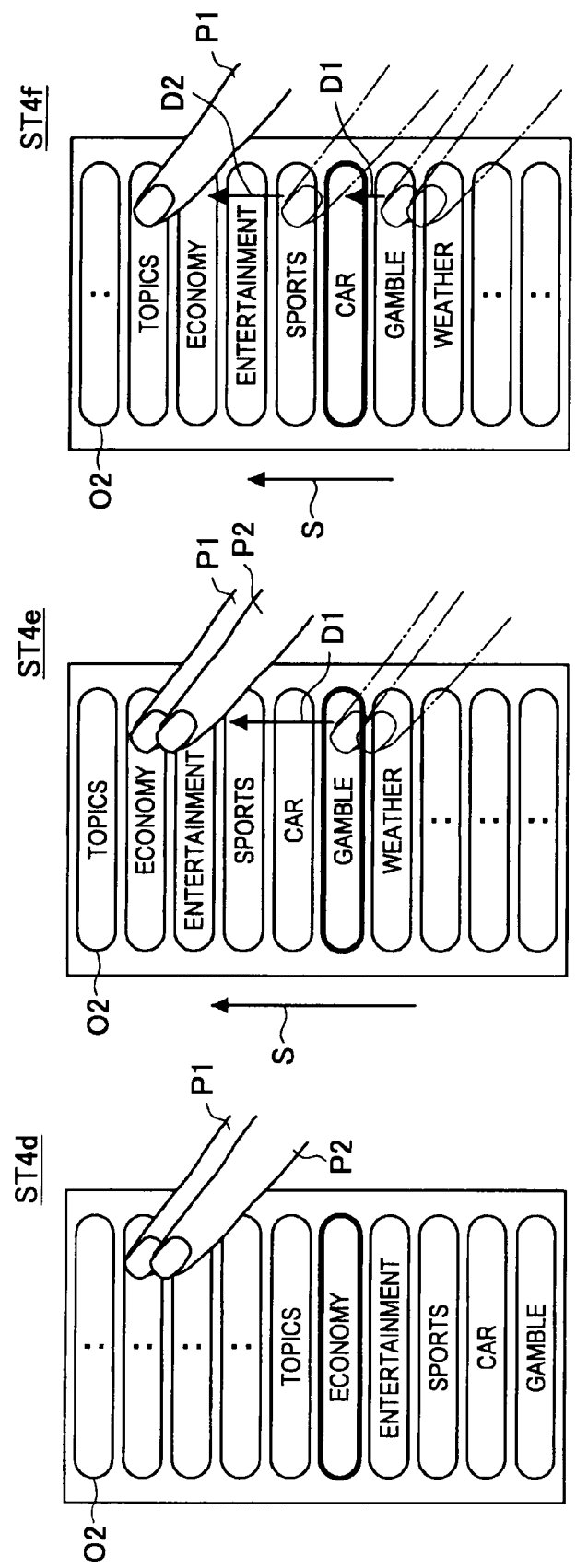
FIG. 6B is a diagram (2/3) showing an application example to the web browsing software.
Figure 6C:
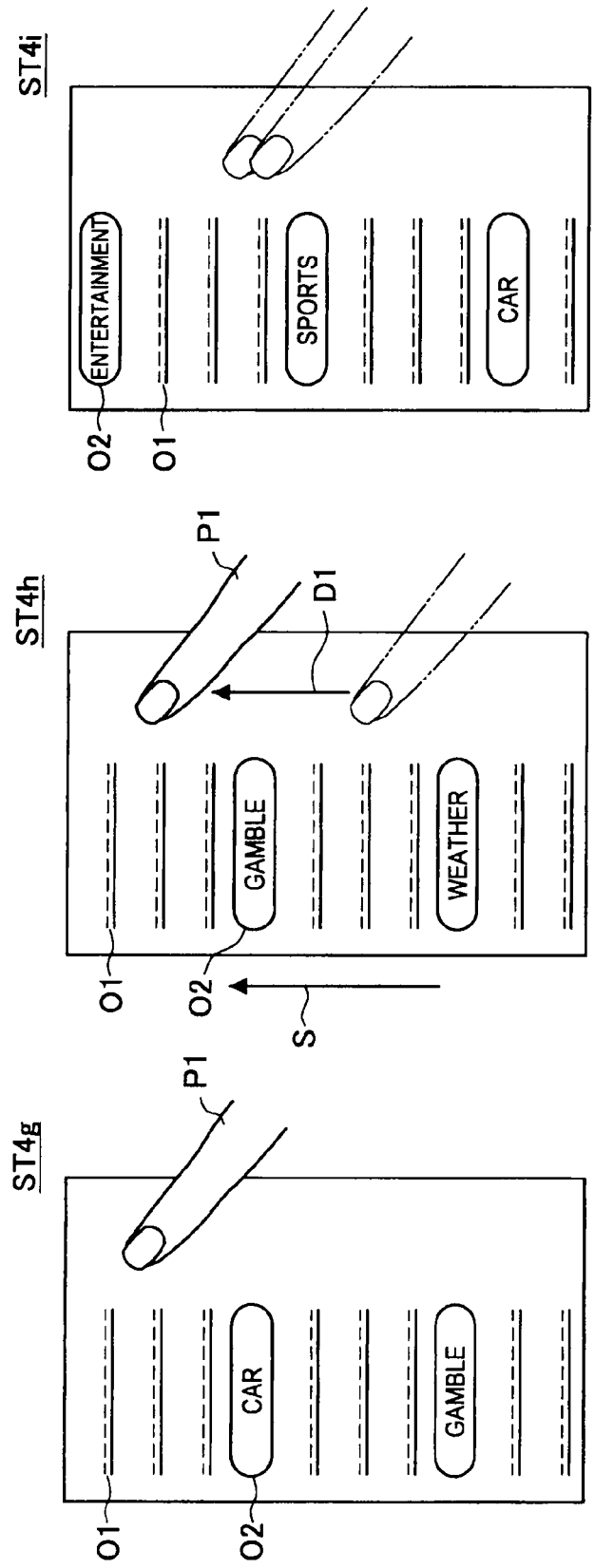
FIG. 6C is a diagram (3/3) showing an application example to the web browsing software.

FIGS. 6A to 6C show the application examples to the web browsing software. In the web browsing software, for example, display items O of a first layer correspond to news items O1 linked to a specific webpage, and display items O of a second layer of a high level correspond to categories O2. Here, for example, the news items O1 are divided into categories O2 corresponding to the news items O1 including "Topics," "Economy," "Entertainment," and the like, and are managed. The first and second layers respectively correspond to the number of manipulating bodies P, "1" and "2."

In state ST4a shown in FIG. 6A, for example, a plurality of news items O1 and categories O2 are displayed in the up/down direction of the display panel 11 in order of a category O2 "Topics," a plurality of news items O1 belonging to the category O2 "Topics," a category O2 "Economy," a plurality of news items O1 belonging to the category O2 "Economy," and a category O2 "Entertainment." As shown in state ST4b, if one manipulating body P1 performs drag manipulation D1 in the up direction in state ST4a, the scroll display S of a plurality of news items O1 and categories O2 is performed in the up direction.

During the drag manipulation D1 of state ST4b, if one other manipulating body P2 makes contact with the display panel 11 and the two manipulating bodies P1 and P2 perform drag manipulation D2 associated with a predetermined movement amount in the up direction as shown in state ST4c, a plurality of categories O2 are displayed in the up/down direction as shown in state ST4d shown in FIG. 6B. Here, in state ST4d, for example, a category O2 "Economy" to which the news items O1 previously displayed in the center of the display panel 11 belong is focused and displayed. As shown in state ST4e, if the two manipulating bodies P1 and P2 perform the drag manipulation D1 in the up direction, the scroll display S of a plurality of categories O2 is performed in the up direction.

If the one manipulating body P2 (or manipulating body P1) is separated from the display panel 11 and the one manipulating body P1 performs the drag manipulation D2 associated with a predetermined movement amount in the up direction as shown in state ST4f during the drag manipulation D1 of state ST4e, a plurality of news items O1 and categories O2 are displayed in the up/down direction as shown in state ST4g shown in FIG. 6C. Here, in state ST4g, for example, news items O1 belonging to a previously focused and displayed category O2 "Car" are arranged in the center of the display panel 11. As shown in state ST4h, if the one manipulating body P1 performs the drag manipulation D1 in the up direction, the scroll display S of a plurality of news items O1 and categories O2 is performed in the up direction.

On the other hand, if the two manipulating bodies P1 and P2 are simultaneously separated from the display panel 11 during the drag manipulation D1 of state ST4e shown in FIG. 6B, a plurality of news items O1 and categories O2 are displayed in the up/down direction as shown in state ST4i shown in FIG. 6C. Here, in state ST4i, for example, news items O1 belonging to a previously focused and displayed category "Sports" are arranged in the center of the display panel 11.

If tap manipulation is performed for any news item O1 in a state in which a plurality of news items O1 are displayed, the news item O1 serving as a tap manipulation target is selected and a webpage linked to the selected news item O1 is displayed. Also, if tap manipulation is performed for any category O2 in a state in which only a plurality of categories O2 are displayed, a plurality of news items O1 belonging to the category O2 serving as a tap manipulation target may be displayed. The case where the drag manipulations D1 and D2 are performed in the up direction has been described above, but the drag manipulations D1 and D2 may be performed in the down direction, and may be performed by switching to the up/down direction. In particular, before/after the layer transition, the drag manipulations D1 and D2 may be performed in different directions.

[5. Summary]

By the information processing device according to the embodiments of the present invention, the number of manipulating bodies P moving on a sensing region is detected along with a movement direction and a movement amount of the manipulating body P, and the scroll display S of display items O belonging to a layer corresponding to the number of manipulating bodies P is performed on the basis of detection results of the movement direction and the movement amount. Thereby, the user can efficiently search for a desired display item O from display items O divided into a plurality of layers by performing the scroll display S of display items O belonging to different layers through a change of the number of manipulating bodies P.

Here, during the drag manipulation D1, the user can avoid the start of unexpected scroll display S due to erroneous manipulation or the like by starting the scroll display S after performing the drag manipulation D1 associated with a predetermined movement amount by a manipulating body P. The user can intuitively perform the drag manipulation D1 by following the movement of the manipulating body P and performing the scroll display S of display items O. During layer transition, the user is notified of the layer transition by using a visual, audible, or tactile measures, thereby understanding the behavior of the information processing device.

Preferred embodiments of the present invention have been described above in detail with reference to the appended drawings, but the present invention is not limited thereto. It should be understood by those skilled in the art that various modifications, combinations, sub-combinations and alterations may occur depending on design requirements and other factors insofar as they are within the scope of the appended claims or the equivalents thereof.

For example, the case where the drag manipulations D1 and D2 are performed in first and second layers or first to third layers has been described in the above-described embodiments, but the drag manipulations D1 and D2 may be performed in first to fourth layers or more. The case where a display item O having a hierarchical relationship with a specific display item O displayed immediately before layer transition is selected if the layer transition is made has been described in the above-described embodiments, but a display item O, which does not have the hierarchical relationship, may be displayed. The case where the scroll display S is performed by the drag manipulation D1 has been described in the above-described embodiments, but the scroll display S may be performed by flick manipulation.

The present application contains subject matter related to that disclosed in Japanese Priority Patent Application JP 2010-32546 filed in the Japan Patent Office on Feb. 17, 2010, the entire content of which is hereby incorporated by reference.

What is claimed is:

1. An information processing device comprising:
 a display unit to display display items belonging to a predetermined layer among display items divided into a plurality of layers, the plurality of layers being arranged in a hierarchy;
 a detection unit to detect a number of one or more manipulating bodies moving on a sensing region along with a movement direction and a movement amount of the one or more manipulating bodies; and
 a display control unit including a processor to perform display control so that display items belonging to the predetermined layer are scroll-displayed on the basis of detection results of the movement direction and the movement amount when a movement of one or more manipulating bodies of a number that corresponds to the predetermined layer is detected, display items belonging to another layer that are among the display items divided into the plurality of layers are displayed when a movement of one or more manipulating bodies of another number that corresponds to the other layer is detected, and the display items belonging to the other layer are scroll-displayed on the basis of detection results of the movement direction and the movement amount.

2. The information processing device according to claim 1, wherein when the movement of the one or more manipulating bodies whose number corresponds to the other layer is detected when the display items belonging to the predetermined layer are scroll-displayed, the display control unit performs the display control so that the display items belonging to the other layer are scroll-displayed.

3. The information processing device according to claim 1, wherein when layer transition of scroll display is made from the predetermined layer to the other layer, the display control unit performs display control so that display items belonging to an upper or lower layer of a display item focused in the predetermined layer immediately before the layer transition is made are displayed among the display items belonging to the other layer.

4. The information processing device according to claim 1, wherein when the movement of the one or more manipulating bodies whose number corresponds to the other layer is not detected, the display control unit performs display control so that display items belonging to a lower layer of a display item focused in the other layer immediately before the movement is not detected are displayed among the display items belonging to the predetermined layer.

5. The information processing device according to claim 1, wherein when a movement of one or more manipulating bodies associated with a movement amount exceeding a predetermined threshold value is detected after a change of the number of one or more manipulating bodies is detected, the display control unit performs display control so that layer transition of scroll display is made.

6. The information processing device according to claim 1, wherein when a movement of one or more manipulating bodies associated with a movement amount exceeding a predetermined threshold value is detected, the display control unit performs display control so that display items are scroll-displayed.

7. The information processing device according to claim 1, wherein the display control unit performs display control so that display items are scroll-displayed by following a movement of the one or more manipulating bodies.

8. The information processing device according to claim 1, further comprising:
 a notification unit to notify an outside of layer transition of scroll display.

9. The information processing device according to claim 1, wherein when one of the predetermined layer and the other layer corresponds to an upper layer and the other corresponds to a lower layer, the display control unit scroll-displays display items of the upper layer and the lower layer when a movement of one or more manipulating bodies whose number corresponds to the lower layer is detected, and scroll-displays display items belonging to the upper layer when a movement of one or more manipulating bodies whose number corresponds to the upper layer is detected.

10. The information processing device according to claim 1, wherein the display unit includes a display panel, and either the display panel and a touch panel that includes the sensing region overlap, or the display panel is separate from a touch pad that includes the sensing region.

11. An information processing method comprising:
displaying display items belonging to a predetermined layer among display items divided into a plurality of layers, the plurality of layers being arranged in a hierarchy;
detecting a number of one or more manipulating bodies moving on a sensing region along with a movement direction and a movement amount of the one or more manipulating bodies;
scroll-displaying display items belonging to the predetermined layer on the basis of detection results of the movement direction and the movement amount when a movement of one or more manipulating bodies of a number that corresponds to the predetermined layer is detected;
displaying display items belonging to another layer that are among the display items divided into the plurality of layers instead of the display items belonging to the predetermined layer when a movement of one or more manipulating bodies of another number that corresponds to the other layer is detected; and
scroll-displaying the display items belonging to the other layer on the basis of detection results of the movement direction and the movement amount.

12. A non-transitory computer readable medium storing a program for causing a computer to perform an information processing method comprising:
displaying display items belonging to a predetermined layer among display items divided into a plurality of layers, the plurality of layers being arranged in a hierarchy;
detecting a number of one or more manipulating bodies moving on a sensing region along with a movement direction and a movement amount of the one or more manipulating bodies;
scroll-displaying display items belonging to the predetermined layer on the basis of detection results of the movement direction and the movement amount when a movement of one or more manipulating bodies of a number that corresponds to the predetermined layer is detected;
displaying display items belonging to another layer that are among the display items divided into the plurality of layers instead of the display items belonging to the predetermined layer when a movement of one or more manipulating bodies of another number that corresponds to the other layer is detected; and
scroll-displaying the display items belonging to the other layer on the basis of detection results of the movement direction and the movement amount.

13. The information processing method according to claim 12, wherein the displaying and the scroll-displaying display items include displaying and scroll-displaying display items on a display panel, and either the display panel and a touch panel that includes the sensing region overlap, or the display panel is separate from a touch pad that includes the sensing region.

14. The non-transitory computer readable medium storing the program for causing the computer to perform the information processing method according to claim 10, wherein the displaying and the scroll-displaying display items include displaying and scroll-displaying display items on a display panel, and either the display panel and a touch panel that includes the sensing region overlap, or the display panel is separate from a touch pad that includes the sensing region.

* * * * *